United States Patent
Sugiyama

(10) Patent No.: US 9,244,646 B2
(45) Date of Patent: Jan. 26, 2016

(54) INFORMATION PROCESSING APPARATUS HAVING HOT FOLDERS, INFORMATION PROCESSING METHOD, AND NON-TRANSITORY COMPUTER-READABLE MEDIUM

(71) Applicant: CANON KABUSHIKI KAISHA, Tokyo (JP)

(72) Inventor: Mikiko Sugiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 13/832,548

(22) Filed: Mar. 15, 2013

(65) Prior Publication Data

US 2013/0271780 A1 Oct. 17, 2013

(30) Foreign Application Priority Data

Apr. 17, 2012 (JP) ................................. 2012-094181

(51) Int. Cl.
*G06F 3/12* (2006.01)
*G06K 15/00* (2006.01)

(52) U.S. Cl.
CPC ............ *G06F 3/1297* (2013.01); *G06F 3/1204* (2013.01); *G06F 3/127* (2013.01); *G06F 3/1254* (2013.01); *G06F 3/1288* (2013.01)

(58) Field of Classification Search
USPC .................................................. 358/1.1–1.16
See application file for complete search history.

(56) References Cited

U.S. PATENT DOCUMENTS

| | | | | |
|---|---|---|---|---|
| 2002/0196451 A1* | 12/2002 | Schlonski et al. | ............. | 358/1.1 |
| 2005/0132346 A1* | 6/2005 | Tsantilis | ........................ | 717/168 |
| 2010/0315661 A1* | 12/2010 | Sato | ............... | 358/1.9 |

FOREIGN PATENT DOCUMENTS

JP 2010-287111 A 12/2010

\* cited by examiner

*Primary Examiner* — Dov Popovici
(74) *Attorney, Agent, or Firm* — Rossi, Kimms & McDowell LLP

(57) ABSTRACT

An information processing apparatus includes: a holding unit which holds pieces of device information of printing apparatuses already connected to the information processing apparatus, and pieces of information of hot folders corresponding to the already-connected printing apparatuses; a determination unit which determines a printing apparatus similar to a printing apparatus newly connected to the information processing apparatus among the already-connected printing apparatuses by comparing device information of the newly-connected printing apparatus with the pieces of device information of the already-connected printing apparatuses; and a generation unit which generates a hot folder corresponding to the newly-connected printing apparatus by copying information of a hot folder corresponding to the printing apparatus determined by the determination unit.

17 Claims, 25 Drawing Sheets

FIG. 2

NEW HOT FOLDER

FOLDER TYPE(T): ● Fixed Type  ○ Flexible Type

HOT FOLDER NAME(F):

FOLDER PATH(K): [REFER TO(B)...]

COMMENT(C):

PRINTER NAME(P): PrinterName[0] ▼

JOB TICKET(J): [REFER TO(W)...]

FOLDER OPTIONS
☑ GENERATE SHORTCUT ON DESKTOP(D)
☐ TEST PRINT(S)
☑ DESIGNATE RESULT FOLDER(A)

RESULT FOLDER PATH(L): [REFER TO(E)...]

[OK] [CANCEL] [HELP(H)]

FIG. 7A

PRINTER INFORMATION

| PRINTER NAME | ~701 |
| SERVER NAME | ~702 |
| DOMAIN NAME | ~703 |
| PORT NAME | ~704 |
| PRINTER DRIVER NAME | ~705 |
| PRINTER DESCRIPTION | ~706 |
| LOCATION | ~707 |
| PRINTER DRIVER INFORMATION POINTER | ~708 |
| PRINT PROCESSOR NAME | ~709 |
| PRINT JOB DATA TYPE | ~710 |
| SECURITY_DESCRIPTOR STRUCTURE POINTER | ~711 |
| PRINTER ATTRIBUTE VALUE | ~712 |

FIG. 7B

| PRINTER ATTRIBUTE VALUE |
|---|
| DIRECT |
| DO_COMPLETE_FIRST |
| ENABLE_DEVQ |
| HIDDEN |
| KEEPRINTEDJOBS |
| LOCAL |
| NETWORK |
| PUBLISHED |
| QUEUED |
| RAW_ONLY |
| SHARED |

FIG. 9A

PRINTER DRIVER INFORMATION

| | |
|---|---|
| DEVICE NAME | ~900 |
| DRIVER VERSION | ~901 |
| PUBLIC SETTING SIZE | ~902 |
| PRIVATE SETTING SIZE | ~903 |
| SUPPORT SETTING FLAG | ~904 |
| PAPER ORIENTATION FLAG | ~905 |
| PAPER SIZE | ~906 |
| PAPER LENGTH IN PORTRAIT MODE | ~907 |
| PAPER WIDTH IN VERTICAL WRITING MODE | ~908 |
| PRINTOUT SCALING COEFFICIENT | ~909 |
| COPY COUNT | ~910 |
| PAPER SUPPLY APPARATUS INFORMATION | ~911 |
| PRINTER RESOLUTION | ~912 |
| COLOR DESIGNATION FLAG | ~913 |
| DOUBLE-SIDED PRINTING FLAG | ~914 |
| PRINTER VERTICAL RESOLUTION | ~915 |
| X RESOLUTION | ~916 |
| TrueType FONT PRINTING METHOD INFORMATION | ~917 |
| PAPER NAME | ~918 |
| PIXEL COUNT | ~919 |
| CMM USE FLAG | ~920 |
| COLOR MATCHING METHOD | ~921 |
| PRINTING MEDIUM TYPE | ~922 |
| DITHERING METHOD | ~923 |

FIG. 9B

PAPER ORIENTATION FLAG ~905

| PORTRAIT |
|---|
| LANDSCAPE |

PAPER SIZE INFORMATION ~906

| Letter 8 1/2×11 INCHES |
|---|
| Legal 8 1/2×14 INCHES |
| A4 SHEET 210×297mm |
| C SHEET 17×22 INCHES |
| D SHEET 22×34 INCHES |
| E SHEET 34×44 INCHES |
| Letter Small 8 1/2×11 INCHES |
| Tabloid, 11×17 INCHES |
| Ledger, 17×11 INCHES |
| Statement, 5 1/2×8 1/2 INCHES |
| Executive, 7 1/4×10 1/2 INCHES |
| A3 SHEET, 297×420mm |
| A4small SHEET, 210×297mm |
| A5 SHEET, 148×210mm |
| B4 SHEET, 250×354mm |
| B5 SHEET, 182×257mm |
| Folio, 8 1/2×13 INCHES |
| Quarto, 215×275mm |
| 10×14 INCHES SHEET |
| 11×17 INCHES SHEET |
| Note, 8 1/2×11 INCHES |
| #9 Envelope, 3 7/8×8 7/8 INCHES |
| #10 Envelope, 4 1/8×9 1/2 INCHES |
| #11 Envelope, 4 1/2×10 3/8 INCHES |
| #12 Envelope, 4 3/4×11 INCHES |
| : |

911

PAPER SUPPLY APPARATUS INFORMATION

| SINGLE PAPER SOURCE |
|---|
| LOWER PAPER TRAY |
| MIDDLE PAPER TRAY |
| MANUAL PAPER FEEDER |
| ENVELOPE FEEDER |
| MANUAL ENVELOPE FEEDER |
| AUTO PAPER TRAY SELECTION |
| TRACTOR FEEDER |
| SMALL PAPER SOURCE |
| LARGE PAPER SOURCE |
| LARGE-VOLUME PAPER TRAY |
| PAPER CASSETTE |

FIG. 9C

912 PRINTER RESOLUTION INFORMATION

| HIGH RESOLUTION |
| INTERMEDIATE RESOLUTION |
| LOW RESOLUTION |
| DRAFT PRINTING RESOLUTION |

913 COLOR DESIGNATION FLAG

| COLOR |
| MONOCHROME |

914 DOUBLE-SIDED PRINTING FLAG

| NO DOUBLE-SIDED PRINTING |
| LANDSCAPE |
| PORTRAIT |

FIG. 9D

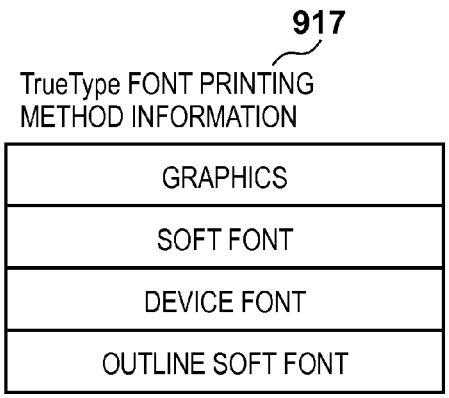

917
TrueType FONT PRINTING METHOD INFORMATION

| GRAPHICS |
| SOFT FONT |
| DEVICE FONT |
| OUTLINE SOFT FONT |

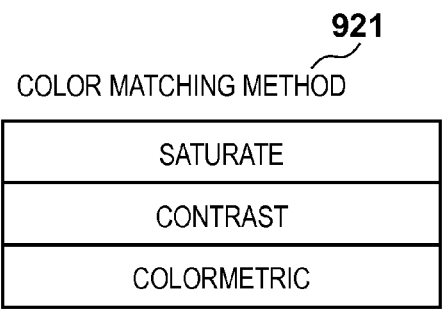

921
COLOR MATCHING METHOD

| SATURATE |
| CONTRAST |
| COLORMETRIC |

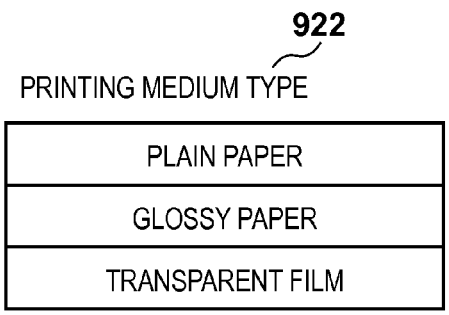

922
PRINTING MEDIUM TYPE

| PLAIN PAPER |
| GLOSSY PAPER |
| TRANSPARENT FILM |

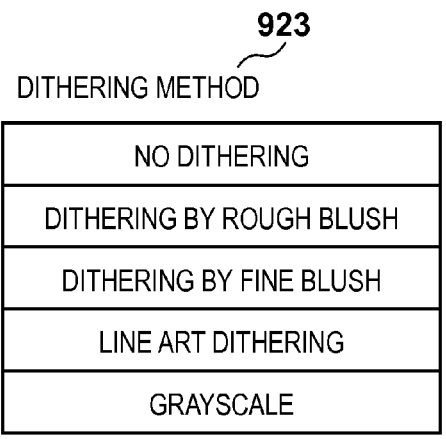

923
DITHERING METHOD

| NO DITHERING |
| DITHERING BY ROUGH BLUSH |
| DITHERING BY FINE BLUSH |
| LINE ART DITHERING |
| GRAYSCALE |

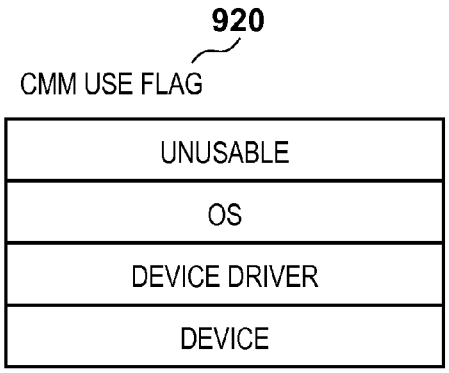

920
CMM USE FLAG

| UNUSABLE |
| OS |
| DEVICE DRIVER |
| DEVICE |

F I G. 13

HOT FOLDER INFORMATION

| | |
|---|---|
| HotFolder Type | ~1301 |
| HotFolder Name | ~1302 |
| HotFolder Path | ~1303 |
| Comment | ~1304 |
| PRINTER NAME | ~1305 |
| PRINT SETTING INFORMATION | ~1306 |
| SHORTCUT KEY GENERATION | ~1307 |
| JOB DATA SAVE | ~1308 |
| RESULT FOLDER DESIGNATION | ~1309 |
| RESULT FOLDER PATH | ~1310 |
| MONITORING METHOD | ~1311 |

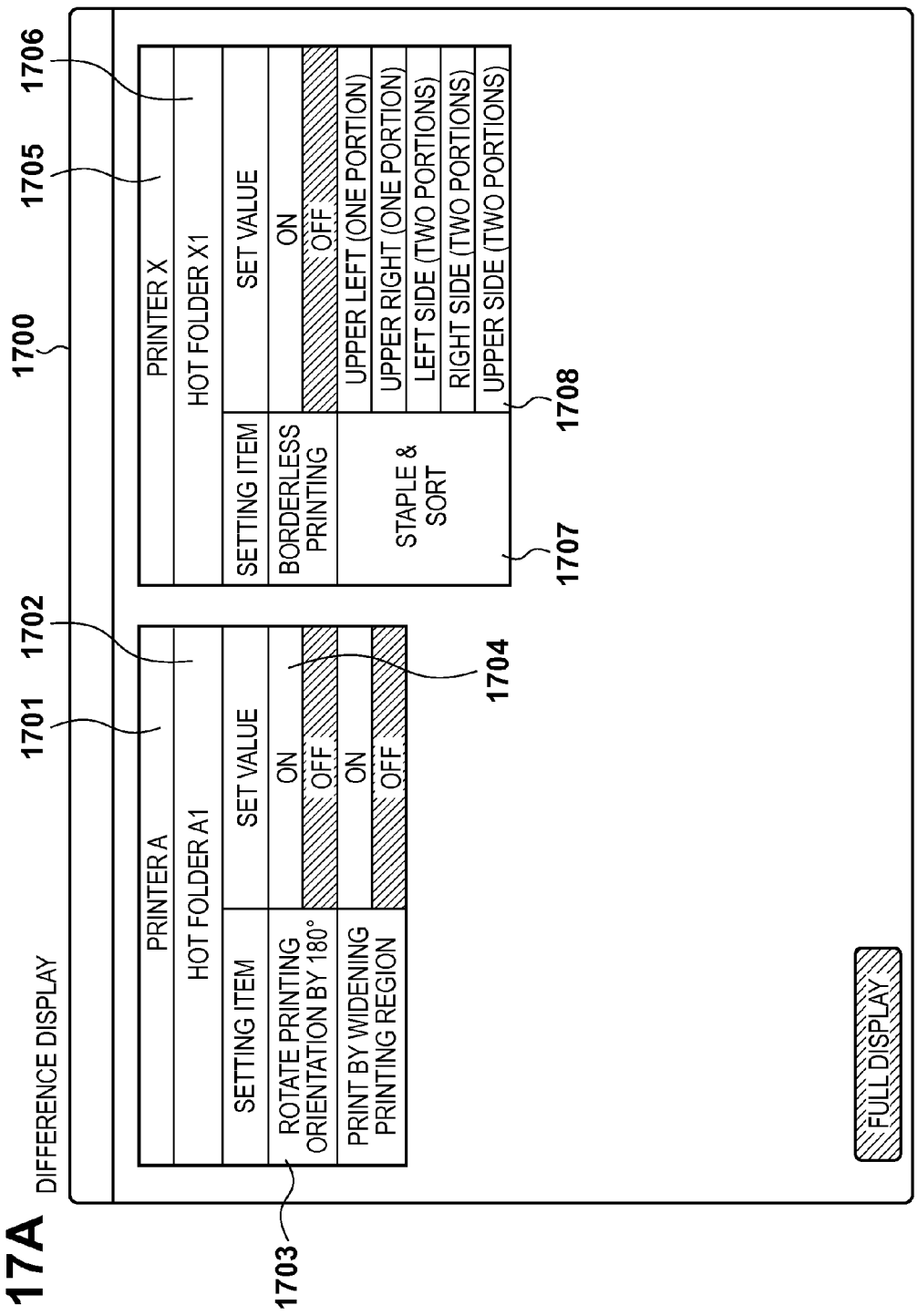

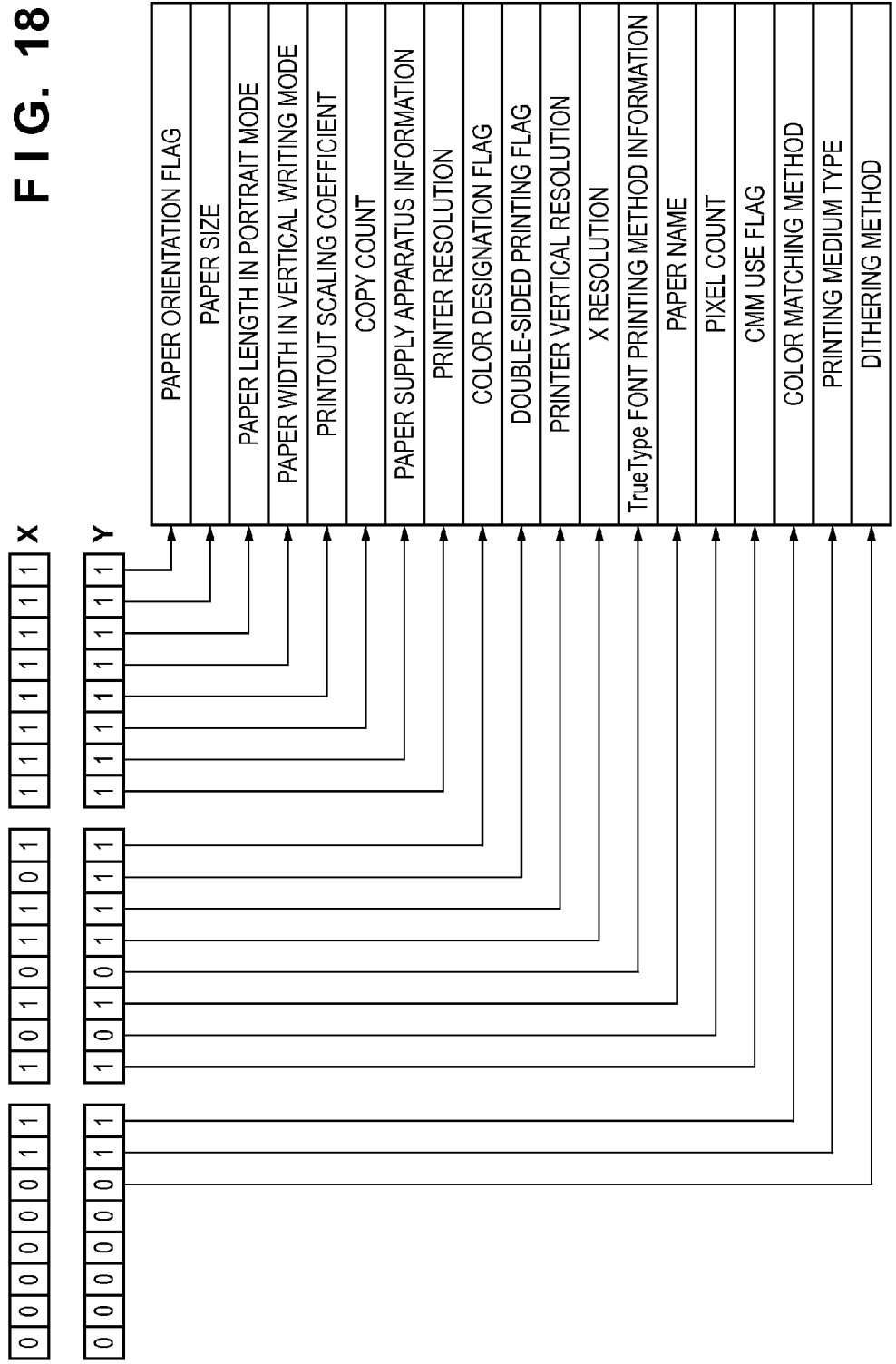

F I G. 19
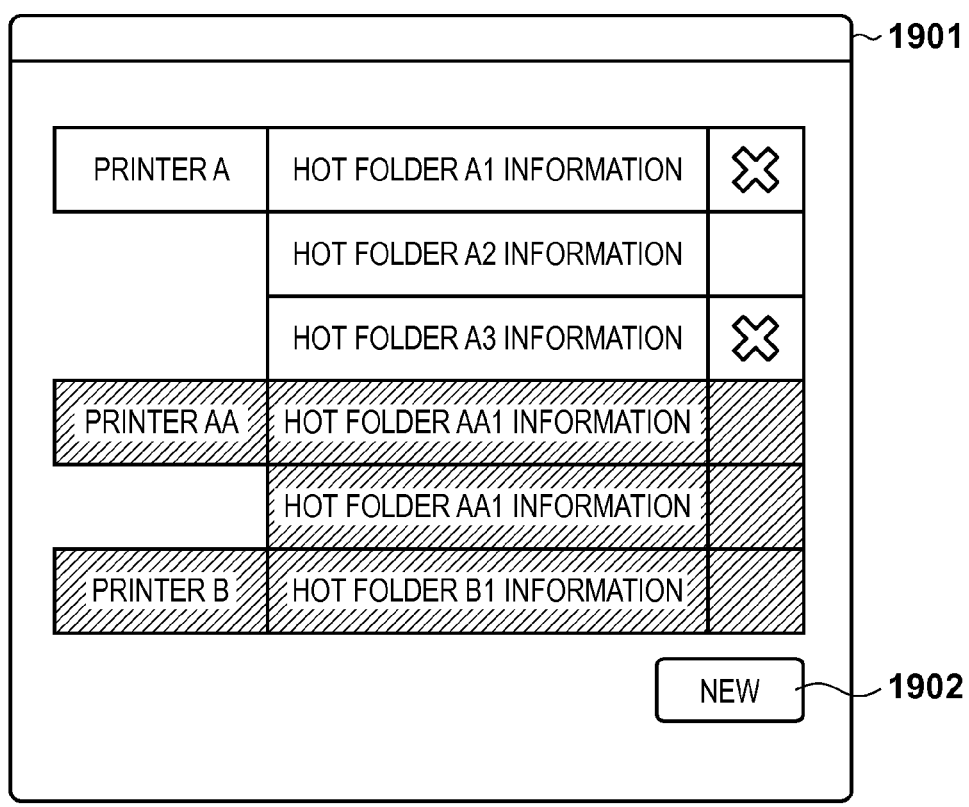

INFORMATION PROCESSING APPARATUS HAVING HOT FOLDERS, INFORMATION PROCESSING METHOD, AND NON-TRANSITORY COMPUTER-READABLE MEDIUM

BACKGROUND OF THE INVENTION

1. Field of the Invention

The present invention relates to an information processing apparatus, information processing method, and non-transitory computer-readable medium. Particularly, the present invention relates to a method of generating a hot folder corresponding to a printing apparatus.

2. Description of the Related Art

In a conventional hot folder system, an information processing apparatus having a hot folder function is connected to many printing apparatuses on a network. When print data is input to a predetermined hot folder held in the information processing apparatus, the information processing apparatus transmits the print data to a printing apparatus to generate a printed material.

The hot folder system is used in, for example, a booklet printing company. In the hot folder system, various printing apparatuses are connected, a printing apparatus is selected in accordance with the form and purpose of a printed material, and the selected printing apparatus outputs the printed material. Print settings and information complying with a purpose such as a printing apparatus to print are held in advance for each hot folder, facilitating printing.

When generating a hot folder for a newly-connected printing apparatus, the operator needs to execute the following work in the conventional hot folder system. For example, as the first method, the operator generates a hot folder for a newly-connected printing apparatus at an arbitrary timing. At this time, the operator designates various settings one by one in accordance with the purpose of printing via a hot folder generation screen 201 as shown in FIG. 2, and generates a hot folder. Alternatively, as the second method, first, the operator starts generating a hot folder for a newly-connected printing apparatus at an arbitrary timing. Then, the operator selects a hot folder (hot folder template) prepared in advance in the hot folder system, and copies the template to generate a hot folder (see Japanese Patent Laid-Open No. 2010-287111).

The conventional technique undesirably puts a heavy burden on the user when newly generating a hot folder. More specifically, the user needs to individually set setting information by using a hot folder setting screen. Alternatively, hot folder templates for a plurality of hot folders need to be prepared in advance.

SUMMARY OF THE INVENTION

The present invention has been made to solve the above-described problems, and the present invention can easily generate and use a hot folder.

According to one aspect of the present invention, there is provided an information processing apparatus comprising: a holding unit configured to hold pieces of device information of printing apparatuses already connected to the information processing apparatus, and pieces of information of hot folders corresponding to the already-connected printing apparatuses; a determination unit configured to determine a printing apparatus similar to a printing apparatus newly connected to the information processing apparatus among the already-connected printing apparatuses by comparing device information of the newly-connected printing apparatus with the pieces of device information of the already-connected printing apparatuses; and a generation unit configured to generate a hot folder corresponding to the newly-connected printing apparatus by copying information of a hot folder corresponding to the printing apparatus determined by the determination unit.

According to another aspect of the present invention, there is provided an information processing method in an information processing apparatus, comprising: holding, in a storage unit, pieces of device information of printing apparatuses already connected to the information processing apparatus, and pieces of information of hot folders corresponding to the already-connected printing apparatuses; determining a printing apparatus similar to a printing apparatus newly connected to the information processing apparatus among the already-connected printing apparatuses by comparing device information of the newly-connected printing apparatus with the pieces of device information of the already-connected printing apparatuses; and generating a hot folder corresponding to the newly-connected printing apparatus by copying information of a hot folder corresponding to the determined printing apparatus.

According to another aspect of the present invention, there is provided a non-transitory computer-readable medium storing a program for causing a computer to function as a holding unit configured to hold pieces of device information of printing apparatuses already connected to the computer, and pieces of information of hot folders corresponding to the already-connected printing apparatuses, a determination unit configured to determine a printing apparatus similar to a printing apparatus newly connected to the computer among the already-connected printing apparatuses by comparing device information of the newly-connected printing apparatus with the pieces of device information of the already-connected printing apparatuses, and a generation unit configured to generate a hot folder corresponding to the newly-connected printing apparatus by copying information of a hot folder corresponding to the printing apparatus determined by the determination unit.

According to the present invention, a hot folder can be easily generated, and the generated hot folder can be easily used.

Further features of the present invention will become apparent from the following description of exemplary embodiments (with reference to the attached drawings).

BRIEF DESCRIPTION OF THE DRAWINGS

FIG. 2 is a view exemplifying a hot folder generation screen;

FIGS. 7A and 7B are views exemplifying printer information and attribute values according to the first embodiment;

FIG. 9A is a view exemplifying printer driver information according to the first embodiment;

FIG. 9B is a view exemplifying various types of setting information according to the first embodiment;

FIG. 9C is a view exemplifying various types of setting information according to the first embodiment;

FIG. 9D is a view exemplifying various types of setting information according to the first embodiment;

FIG. 13 is a view exemplifying hot folder information according to the first embodiment;

FIGS. 17A and 17B are views each exemplifying a re-setting screen according to the first embodiment;

FIG. 18 is a view exemplifying the support setting flag of a connected printer according to the first embodiment;

FIG. 19 is a view exemplifying a copy source printer hot folder candidate selection screen according to the second embodiment;

DESCRIPTION OF THE EMBODIMENTS

Embodiments of the present invention will now be described in detail with reference to the accompanying drawings. Note that arrangements to be described in the following embodiments are merely examples, and the present invention is not limited to illustrated arrangements.

<First Embodiment>

[System Arrangement]

Figure 1:
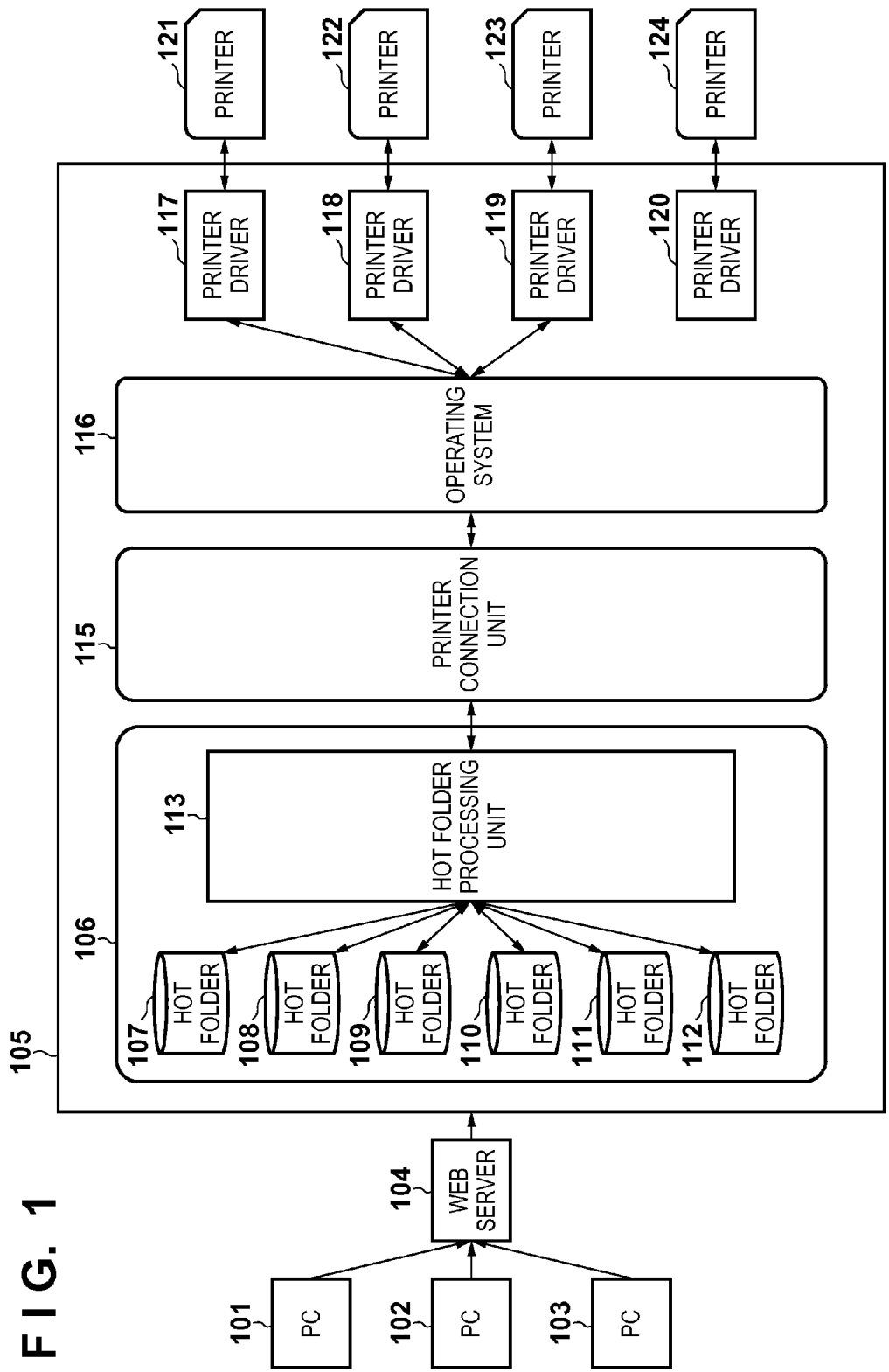
FIG. 1 is a block diagram exemplifying the schematic arrangement of a system.

FIG. 1 is a block diagram showing the schematic arrangement of a system according to the present invention. A hot folder system is mounted in an information processing apparatus (to be referred to as a host PC 105 hereinafter). An application (not shown) for utilizing the hot folder system is installed in a plurality of client PCs 101 to 103 connected to the host PC 105 via respective networks. The application is connectable to the host PC 105 via a web server 104.

Also, a plurality of printers 121 to 124 serving as printing apparatuses are connected to the host PC 105 via a network. The host PC 105 includes a hot folder system unit 106, printer connection unit 115, and operating system 116. In addition, the host PC 105 includes a plurality of printer drivers 117 to 120 which are device drivers corresponding to the respective printers connected to the host PC 105. In this case, the printer driver 117 corresponds to the printer 121. Similarly, the printer drivers 118 to 120 correspond to the printers 122 to 124, respectively.

The internal arrangement of the host PC 105 will be explained. The hot folder system unit 106 includes a plurality of hot folders 107 to 112 serving as storage areas for storing print data from the client PCs 101 to 103. Each hot folder is associated in advance with information such as a print data printing method and output destination printer. The information associated with a hot folder will be described as "hot folder information" in the following description. Details of the hot folder information will be described with reference to FIG. 13 and the like. The number of hot folders in the hot folder system unit 106 is not particularly limited, and a hot folder may be generated in accordance with the purpose of the user.

The hot folder system unit 106 includes a hot folder processing unit 113. The hot folder processing unit 113 monitors print data input to a hot folder and sends it to the printer connection unit 115. The hot folder system unit 106 manages hot folder information. In FIG. 1, assume that the hot folders 107 to 109 correspond to the printer 121. Also, assume that the hot folders 110 and 111 correspond to the printer 122. Assume that the hot folder 112 corresponds to the printer 123.

Next, the printer connection unit 115 will be explained. The printer connection unit 115 is connected to the printer drivers 117 to 120 via the operating system 116 or directly, and controls printers connected to the host PC 105. The printer connection unit 115 acquires and manages printer information of the printers 121 to 124 connected to the host PC 105.

In the system shown in FIG. 1, print data is processed as follows. Print data sent from the client PC is input to one of the hot folders in the host PC 105 via the web server 104. For example, the hot folder processing unit 113 detects that print data has been input to the hot folder 107, and processes hot folder information associated with the hot folder 107. Then, the hot folder processing unit 113 sends the print data to the printer connection unit 115. The printer connection unit 115 is connected via the operating system 116 to the printer driver 117 of the printer 121 corresponding to the hot folder 107. Then, the printer driver 117 sends the print data to the printer 121. As will be described later, when print settings are defined for a hot folder, the hot folder processing unit 113 transmits the print data input to the hot folder and the print settings to the printer driver 117 via the printer connection unit 115. The printer driver 117 processes the print data in accordance with the print settings, and transmits the processed print data to the printer 121. Note that processing of print data may be executed in the printer 121. The printer driver 117 converts the received print data into print data (page description language) interpretable by the printer 121, and transmits the converted print data to the printer 121.

[Hardware Arrangement of Host PC]

Subsequently, the hardware arrangement of the host PC 105 serving as the information processing apparatus according to the present invention will be exemplified in the block diagram of FIG. 3.

The host PC 105 serving as the information processing apparatus according to the present invention has, for example, the arrangement of a general personal computer. For example, as shown in FIG. 3, the host PC 105 includes a CPU 302, ROM 303, RAM 304, input I/F 301, input device 306, output I/F 305, and system bus 311. A keyboard, pointing device, and the like are connected as the input device 306 to the input I/F 301. A display device 307 such as a monitor and printing apparatuses 308 to 310 such as printers are connected to the output I/F 305. Storage devices such as the ROM 303 and RAM 304 store application programs, printing-related programs, printer drivers, and an operating system.

The system bus 311 is used to exchange data between the respective units connected to the system bus 311. The CPU 302 controls the overall host PC 105 in accordance with programs stored in the ROM 303 and RAM 304. The RAM 304 is also used as a work area when the CPU 302 performs various processes. The input device 306 transfers an instruction from the operator to the CPU 302 via the input I/F 301. Note that the hot folder system unit 106 receives an input instruction based on a setting screen or the like displayed on the display device 307. The display device 307 displays a setting screen or the like generated by the hot folder system unit 106. The output I/F 305 sends print data to one of the printing apparatuses 308 to 310. Then, the printing apparatus performs output processing (for example, print processing).

Figure 3:
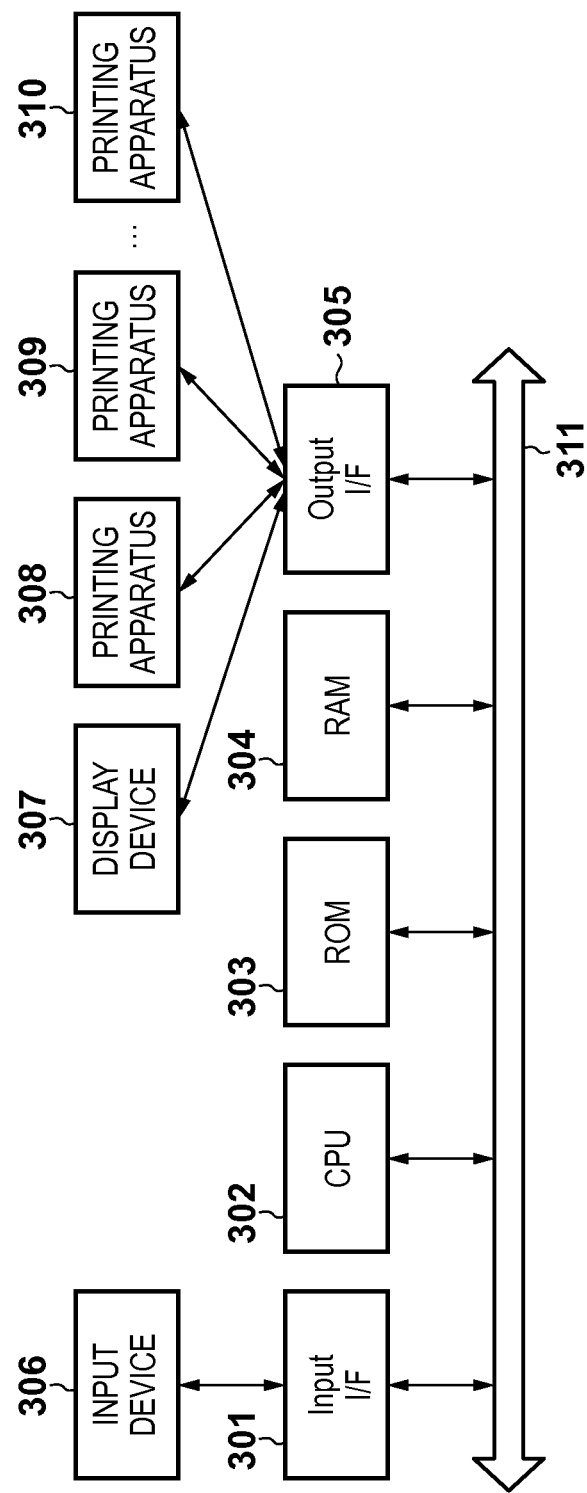
FIG. 3 is a block diagram exemplifying the schematic arrangement of a host PC according to the first embodiment.

Although a plurality of output apparatuses such as printers are connected in FIG. 3, an arbitrary number of output apparatuses are connectable.

[Software Arrangement of Host PC]

Figure 4:
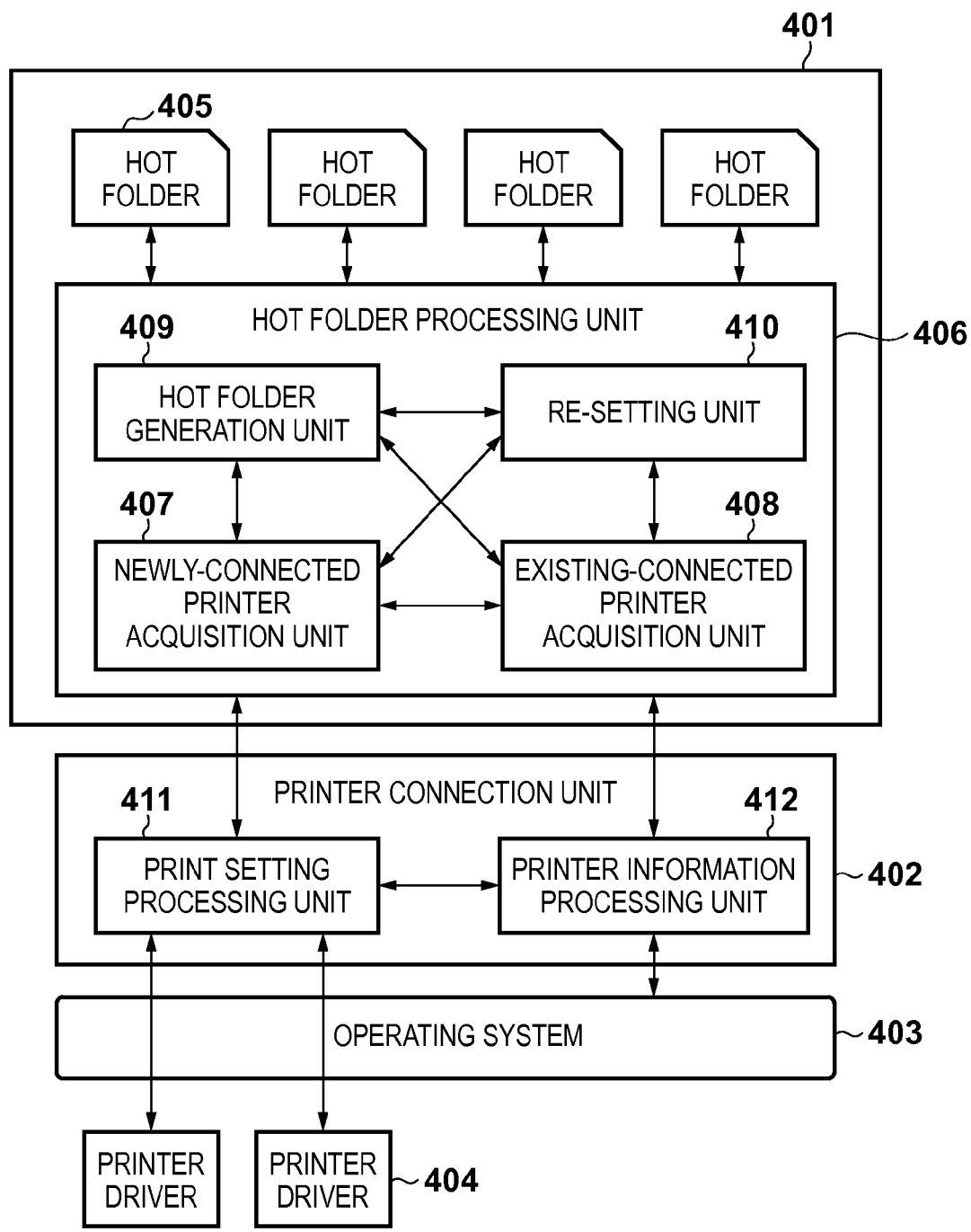
FIG. 4 is a block diagram exemplifying the system arrangement of a printing apparatus according to the first embodiment.

The software arrangement of the information processing apparatus according to the present invention will be exemplified with reference to FIG. 4.

FIG. 4 shows the relationship between a hot folder system unit 401, a printer connection unit 402, an operating system 403, and printer drivers 404 in the host PC 105. The hot folder system unit 401 in FIG. 4 corresponds to the hot folder system unit 106 in FIG. 1, and the printer connection unit 402 corresponds to the printer connection unit 115 in FIG. 1. The operating system 403 in FIG. 4 corresponds to the operating system 116 in FIG. 1, and the printer drivers 404 correspond to the printer drivers 117 to 120 in FIG. 1.

The hot folder system unit 401 includes a hot folder processing unit 406 and a plurality of hot folders 405. The hot folder processing unit 406 includes a newly-connected printer acquisition unit 407, existing-connected printer acquisition unit 408, hot folder generation unit 409, and re-setting unit 410. The hot folder processing unit 406 performs management of the hot folders 405, monitoring of print data, sending of print data to the printer connection unit 402, and the like. The newly-connected printer acquisition unit 407 monitors whether a printer has newly been connected to the host PC 105. The existing-connected printer acquisition unit 408 acquires, from the printer connection unit 402, printer information of printers already connected to the host PC 105, and manages it. The hot folder generation unit 409 specifies a printer similar to a newly-connected printer by using information of already-connected printers. The hot folder generation unit 409 generates a hot folder corresponding to the newly-connected printer by using, as a copy source, a hot folder corresponding to the printer specified as a printer of high similarity.

The re-setting unit 410 displays setting items for printing items which need to be set again with respect to the printing items of a copy source hot folder. The operator sets again the displayed setting items, and can prevent a mismatch regarding the hot folder generated by copying. The re-setting processing will be described later.

The printer connection unit 402 includes a print setting processing unit 411 and printer information processing unit 412. The print setting processing unit 411 acquires the print setting items and set values of a connected printer via the printer driver 404, and manages them. The printer information processing unit 412 is a processing unit which acquires information of a connected printer from the operating system 403.

In this specification, a printer which has already been connected to the host PC 105 and managed will be described as an "existing-connected printer", and a printer newly connected to the host PC 105 will be described as a "newly-connected printer" for convenience.

[Various Types of Information]

Printer information, printer driver information, and hot folder information which are processed in the hot folder system according to the present invention will be explained.

(Printer Information)

FIGS. 7A and 7B exemplify printer information according to the embodiment. As shown in FIG. 7A, the printer information serving as device information includes various types of information associated with the network connection of a printer. The printer information includes, for example, a printer name 701 for identifying a printer, a name 702 of a server to which a printer is connected, a domain name 703, a port name 704, a printer driver name 705, a printer description 706 for describing a printer, a location 707, a printer driver information pointer 708, a print processor name 709, a print job data type 710, a SECURITY_DESCRIPTOR structure pointer 711, and a printer attribute value 712 representing a printer type.

The printer driver information pointer 708 is pointer to printer driver information at which printer driver information is stored.

FIG. 7B exemplifies the printer attribute value 712 included in the printer information of FIG. 7A. Note that the printer attribute value represents a print queue and printer attribute. The printer attribute value is not specific to the present invention and is similar to one disclosed in prior arts, so a detailed description thereof will be omitted.

The printer driver information will be explained in detail later with reference to FIG. 9A. When a printer driver is installed, the operating system 116 generates various types of information in the printer information. If necessary, a setting screen is displayed for the operator to prompt him to set values.

(Printer Driver Information)

Printer driver information according to the embodiment will be explained. As the printer driver information, information of a printer driver and print setting information of a printer are held. When a printer driver is installed, the printer connection unit 402 generates printer driver information. FIGS. 9A to 9D exemplify printer driver information. FIG. 9A shows the structure of the printer driver information. FIGS. 9B to 9D show values set in the respective setting items of the printer driver information.

As shown in FIG. 9A, the printer driver information includes, for example, a device name 900, a driver version 901, a public setting size 902, a private setting size 903, a support setting flag 904, a paper orientation flag 905, a paper size 906, a paper length 907 in the portrait mode, a paper width 908 in the vertical writing mode, a printout scaling coefficient 909, a copy count 910, paper supply apparatus information 911, a printer resolution 912, a color designation flag 913, a double-sided printing flag 914, a printer vertical resolution 915, an X resolution 916, TrueType font printing method information 917, a paper name 918, a pixel count 919, a CMM use flag 920, a color matching method 921, a printing medium type 922, and a dithering method 923.

For example, the device name 900 describes the model name of a connected printer. The driver version 901 includes, for example, the version of the printer driver. The public setting size 902 stores the size of the structure of common print settings (print settings common to respective printers) stored in the printer driver information. The private setting size 903 stores the size of the structure of printer-specific print setting information stored in a printer driver information structure. The printer-specific print setting information is stored subsequently to public print setting information.

The support setting flag 904 represents whether the stored print settings are supported. For example, as shown in FIG. 18, the first bit indicates whether the "paper orientation" can be set. A value "1" indicates that the setting is supported, and a value "0" indicates that the setting is not supported. The second bit indicates whether the "paper size" can be set. The subsequent bits have the same structure, and a description thereof will not be repeated. Note that the support setting flag 904 requires bits by at least the number of print setting items. As shown in (a) of FIG. 9B, the paper orientation flag 905 stores the flag of a paper orientation ("portrait" or "landscape"). As shown in FIG. 9B, the paper size 906 stores a paper size applicable to the printer. The paper length 907 in the portrait mode stores a paper size in the portrait mode. The paper width 908 in the vertical writing mode stores a paper width in the vertical writing mode.

The printout scaling coefficient 909 stores a scaling coefficient used when scaling a printout. The copy count 910 stores a copy count in printing. As shown in FIG. 9B, the paper supply apparatus information 911 stores information of a paper supply apparatus. As shown in FIG. 9C, the printer resolution 912 stores information about the resolution of the printer. As shown in FIG. 9C, the color designation flag 913 represents color or monochrome in color printing. As shown in FIG. 9C, the double-sided printing flag 914 stores a printing method for a printer capable of double-sided printing.

The printer vertical resolution 915 stores the Y resolution of the printer. The X resolution 916 stores the X resolution of the printer. As shown in FIG. 9D, the TrueType font printing method information 917 stores a printing method for the TrueType font. The paper name 918 stores the name of paper for use. The pixel count 919 stores a value which designates the width of a device surface by pixels.

As shown in FIG. 9D, the CMM use flag 920 stores a color matching processing method for a non-CMM application. As shown in FIG. 9D, the color matching method 921 stores a color matching method. As shown in FIG. 9D, the printing medium type 922 stores a medium type in printing. As shown in FIG. 9D, the dithering method 923 stores a dithering method.

The structure of the printer driver information and set values stored in the respective setting items shown in FIGS. 9A to 9D are merely examples, and another structure and set values may be stored in accordance with the functions of a printing apparatus.

(Hot Folder Information)

FIG. 13 exemplifies hot folder information according to the embodiment. The hot folder information stores information about a hot folder for printing by using a hot folder and the printers 121 to 124 connected to the host PC 105.

As shown in FIG. 13, the hot folder information includes HotFolder Type 1301, HotFolder Name 1302, HotFolder Path 1303, Comment 1304, printer name 1305, print setting information 1306, shortcut key generation 1307, Job data save 1308, result folder designation 1309, result folder path 1310, and monitoring method 1311.

The HotFolder Type 1301 stores a hot folder type. The hot folder type set here includes, for example, a flexible type and fixed type. The flexible type does not define in advance print settings for a hot folder, and allows the user to input print setting data together with print data and execute general-purpose print processing. To the contrary, the fixed type defines in advance print settings for a hot folder, and allows the user to input only print data and execute print processing in accordance with the preset print settings.

The HotFolder Name 1302 stores a hot folder name for identifying a hot folder. The HotFolder Path 1303 stores the path of the hot folder. The Comment 1304 stores a common about the hot folder. The printer name 1305 stores the printer name of an output destination associated with the hot folder.

The print setting information 1306 stores the print set values of a printer at the output destination. The print set values are held as another table, and a pointer to the table is stored. The shortcut key generation 1307 stores whether to store a shortcut key on the desktop. The Job data save 1308 stores whether to save job data in a result folder. The "result folder" is a folder which stores information (for example, print data and processing result log) of a job which has completed processing. The result folder designation 1309 stores whether to designate a result folder. When storing job data in the result folder, the result folder path 1310 stores a path to the storage destination. The monitoring method 1311 stores a hot folder monitoring method. The monitoring method may be a setting when periodically confirming a hot folder or when confirming a hot folder upon inputting print data or the like.

[Hot Folder Generation Processing]

Figure 5:
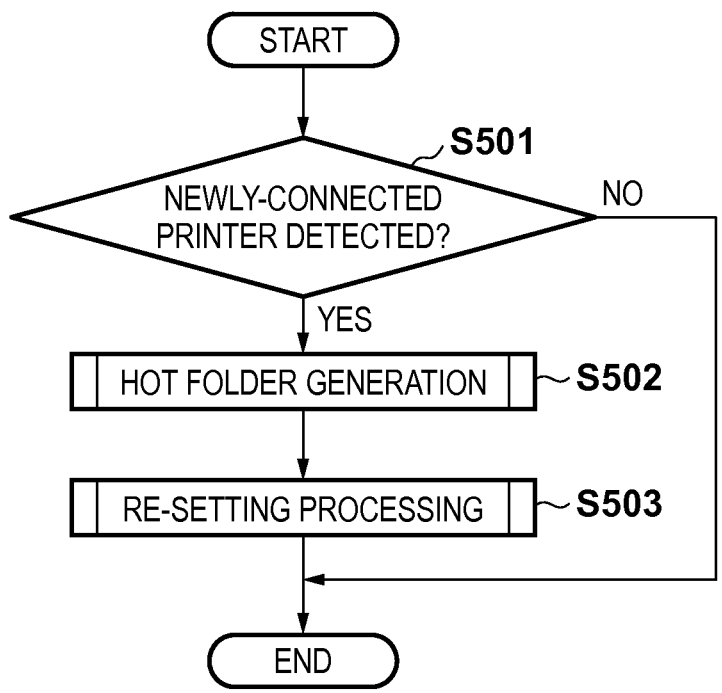
FIG. 5 is a flowchart showing the sequence of print processing according to the first embodiment.

Hot folder generation processing according to the embodiment will be explained with reference to FIG. 5. Note that the flowchart according to the present invention is executed by the host PC 105, and the CPU 302 reads out and executes a program stored in the ROM 303 serving as a storage unit. In this specification, printer information corresponding to a newly-connected printer will be described as "newly-connected printer information". Printer information corresponding to an existing-connected printer will be described as "existing-connected printer information".

(Processing in Printer Connection)

In step S501, the hot folder system unit 106 determines whether a printer has newly been connected to the host PC 105. For example, assume that the printer 124 shown in FIG. 1 is connected to the host PC 105 and the printer driver 120 corresponding to the printer 124 is installed in the host PC 105. The printer connection unit 115 detects via the operating system 116 that the printer 124 has newly been connected. Then, the printer connection unit 115 notifies the hot folder system unit 106 that the printer has newly been connected.

If the hot folder system unit 106 detects that the printer has newly been connected (YES in step S501), it performs hot folder generation processing in step S502. This hot folder generation processing generates a hot folder to be associated with the newly-connected printer. The hot folder generation processing will be described later with reference to FIG. 6 and the like. If the hot folder system unit 106 detects that no printer has newly been connected (NO in step S501), the processing sequence ends.

Figure 8:
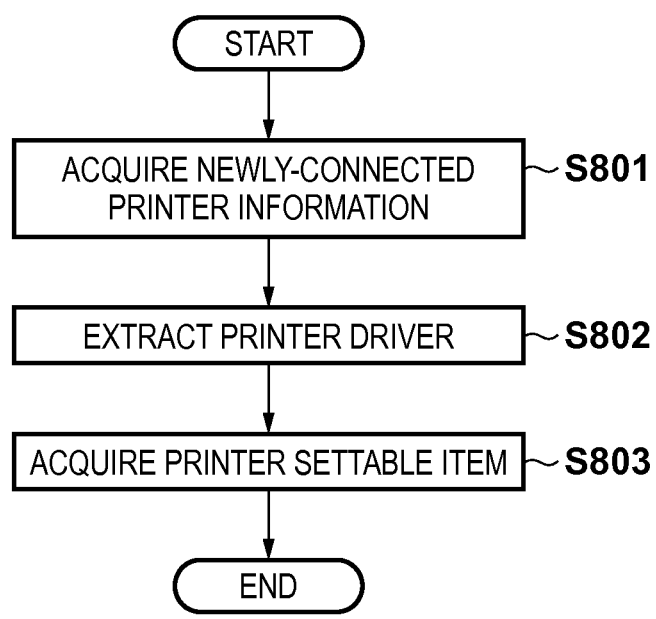
FIG. 8 is a flowchart showing the sequence of newly-connected printer detection processing according to the first embodiment.

After a hot folder is generated for the newly-connected printer in step S502, the hot folder system unit 106 performs re-setting processing in step S503. The re-setting processing will be described later with reference to FIG. 8 and the like. The processing sequence then ends.

(Processing in Printer Connection Cancellation)

Figure 20:
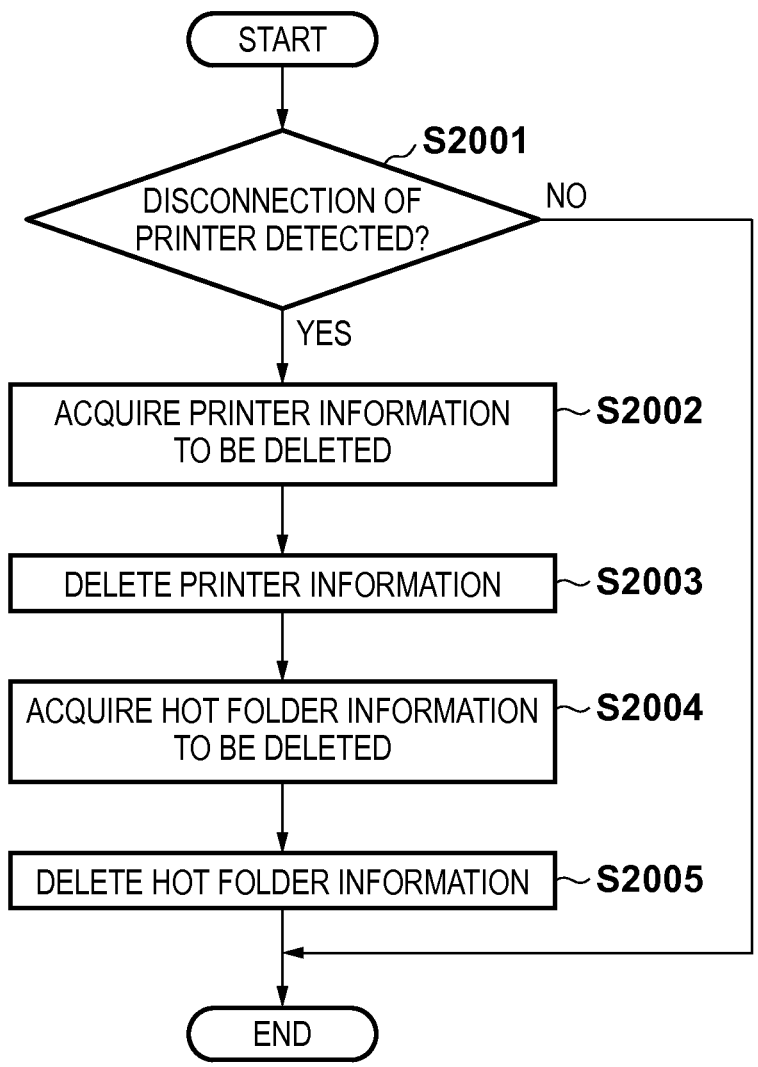
FIG. 20 is a flowchart exemplifying printer information deletion processing according to the first embodiment.

In the embodiment, when connection of a printer connected to the host PC 105 is canceled (disconnected), printer information of the disconnected printer is deleted from existing-connected printer information held in the printer connection unit 115. The deletion processing will be explained with reference to FIG. 20.

For example, assume that the printer 124 shown in FIG. 1 is disconnected from the host PC 105, and the printer driver 120 corresponding to the printer 124 is uninstalled from the host PC 105. In this case, the operating system 116 notifies the printer connection unit 115 that the connection between the printer and the host PC 105 has been canceled.

If the disconnection of the printer is detected (YES in step S2001), the hot folder system unit 106 acquires printer information to be deleted in step S2002. At this time, the hot folder system unit 106 acquires a printer name and printer driver name from the printer connection unit 115, searches existing-connected printer information for corresponding printer information by using the information, and acquires the printer information. In step S2003, the hot folder system unit 106 deletes the printer information acquired in step S2002 from the existing-connected printer information. In step S2004, the hot folder system unit 106 acquires hot folder information associated with the disconnected printer. In step S2005, the hot folder system unit 106 deletes the acquired hot folder information. After that, the processing sequence ends.

(Processing in Updating of Printer Information)

Figure 21:
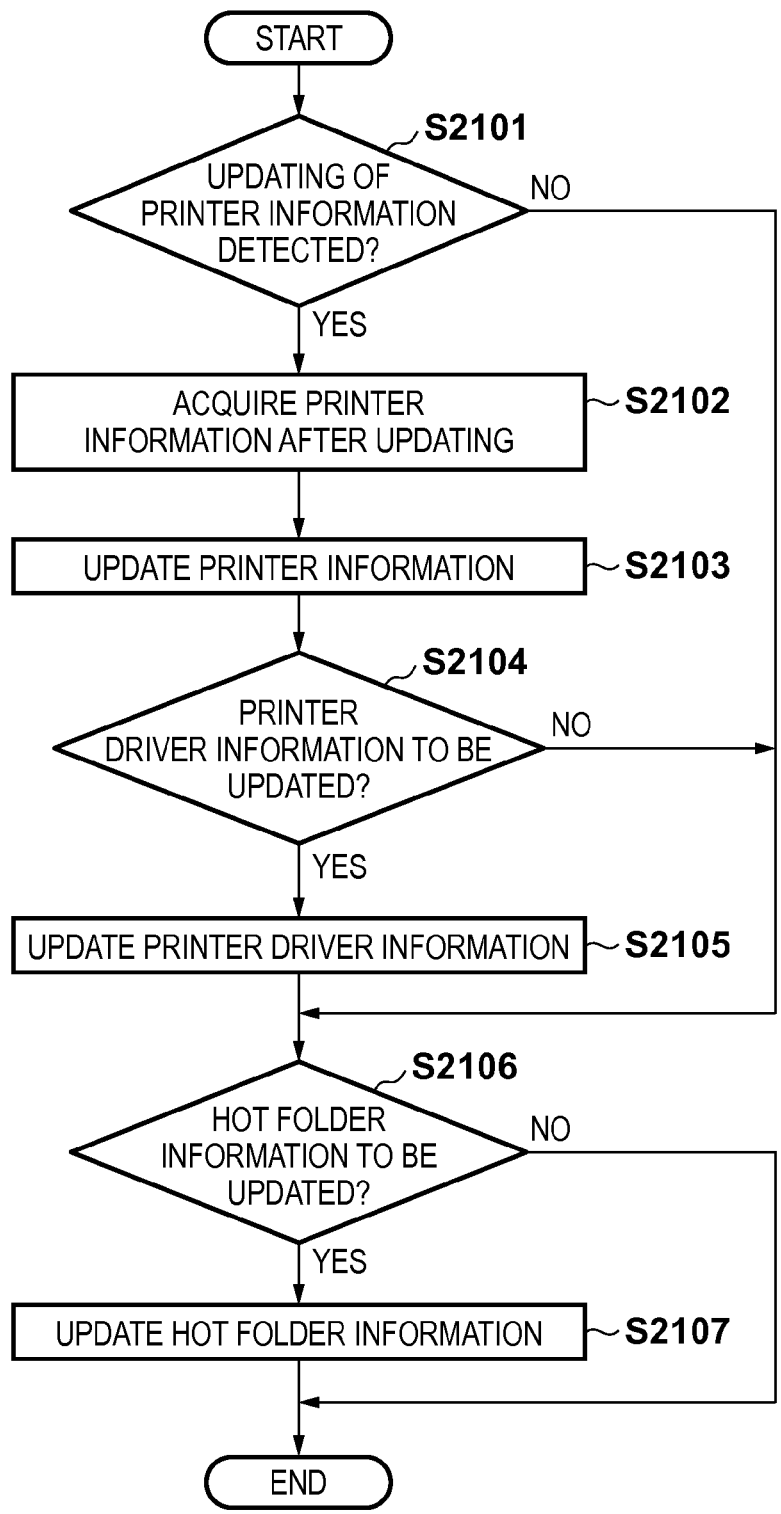
FIG. 21 is a flowchart exemplifying printer information update processing according to the first embodiment.

In the embodiment, when printer information of a printer connected to the host PC 105 is updated, existing-connected printer information held in the printer connection unit 115 is updated. The update processing will be explained with reference to FIG. 21.

For example, assume that the domain name in printer information corresponding to the printer 124 connected to the host PC 105 shown in FIG. 1 has been changed. In step S2101, the printer connection unit 115 detects updating of the printer information via the operating system 116. If the printer connection unit 115 detects updating of the printer information (YES in step S2101), it acquires printer information (for example, the domain name) to be updated in step S2102. In this acquisition method, for example, data may be acquired by displaying via the display device 307 items such as the printer name and server name managed in the printer information, and prompting the user to set them. In step S2103, the printer connection unit 115 updates the printer information to the acquired contents.

In step S2104, the printer connection unit 115 determines whether the printer driver has been changed, and determines whether to update the printer driver information. If the printer connection unit 115 determines to change the printer driver information (YES in step S2104), it updates the printer driver information in step S2105. If no printer information has been updated or it is determined not to update the printer driver information (NO in step S2101 or S2104), the process directly shifts to step S2106. In step S2106, the hot folder system unit 106 determines whether to update the hot folder information. This determination may use a unit for displaying a hot folder change screen (not shown) on the display device 307 and receiving a change from the user. If the hot folder system unit 106 determines to update the hot folder information (YES in step S2106), it acquires changed hot folder information and updates the existing hot folder information in step S2107. Then, the processing sequence ends.

(Hot Folder Generation Processing)

The hot folder generation processing in step S502 of FIG. 5 will be explained with reference to FIG. 6.

In step S601, the hot folder system unit 106 performs printer information acquisition processing for a newly-connected printer. This processing will be explained using an example in which the printer 124 is newly connected in FIG. 1. In the newly-connected printer information acquisition processing, the hot folder system unit 106 acquires printer information about the printer 124. The processing in step S601 will be explained with reference to FIG. 8.

First, in step S801, the host PC 105 acquires newly-connected printer information. In this processing, when a newly-connected printer is detected in step S501 of FIG. 5, the hot folder system unit 106 acquires printer information (including printing information) from the operating system 116 via the printer connection unit 115. The printer information can be acquired by two conventional methods. For example, when the operating system is a Windows® OS, printer information is acquired from a GDI (Graphics Device Interface) using a memory block called a DEVMODE structure. In a printing apparatus using XPS (XML Paper Specification), printer information can be acquired using a print ticket described in XML (eXtensible Markup Language).

Then, in step S802, the hot folder system unit 106 acquires the printer driver name 705 from the printer information acquired in step S801. In step S803, the hot folder system unit 106 acquires printer driver information corresponding to the acquired printer driver name. The hot folder system unit 106 acquires the printer driver information pointer 708, and acquires printer driver information. The hot folder system unit 106 acquires setting items settable in the printer. Thereafter, the processing sequence shown in FIG. 8 ends.

Figure 6:
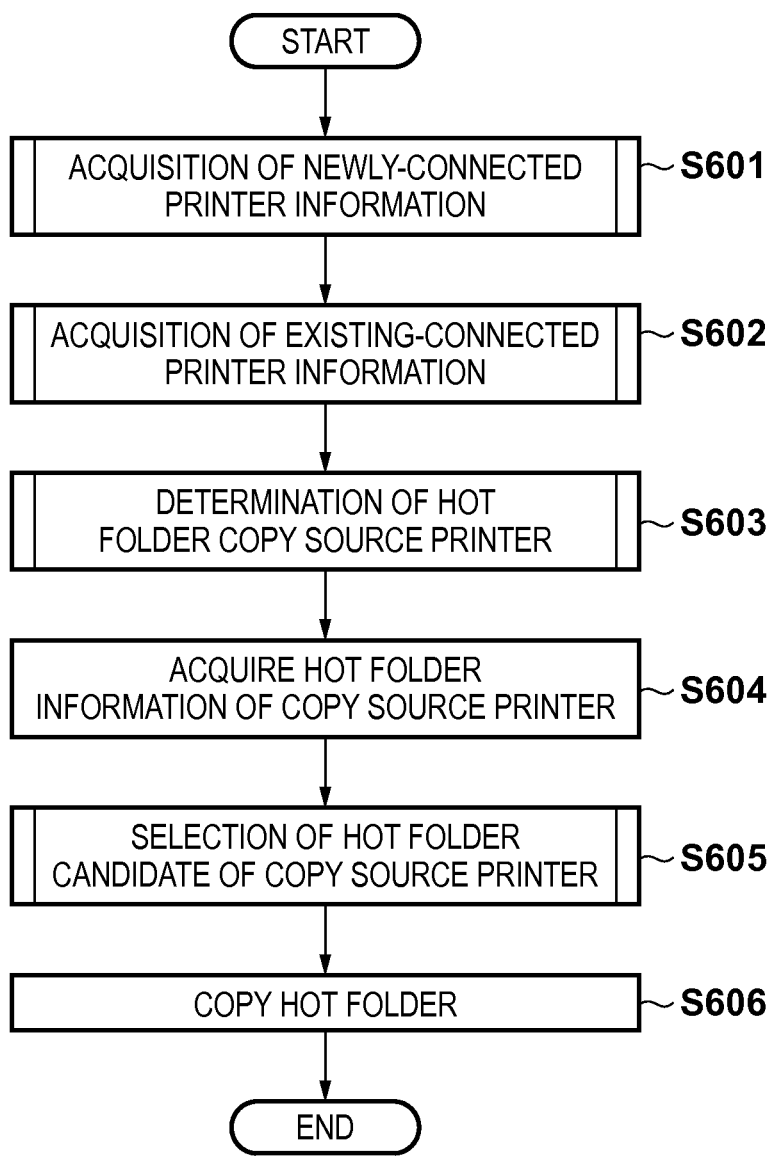
FIG. 6 is a flowchart showing the sequence of hot folder generation processing according to the first embodiment.
Figure 10:
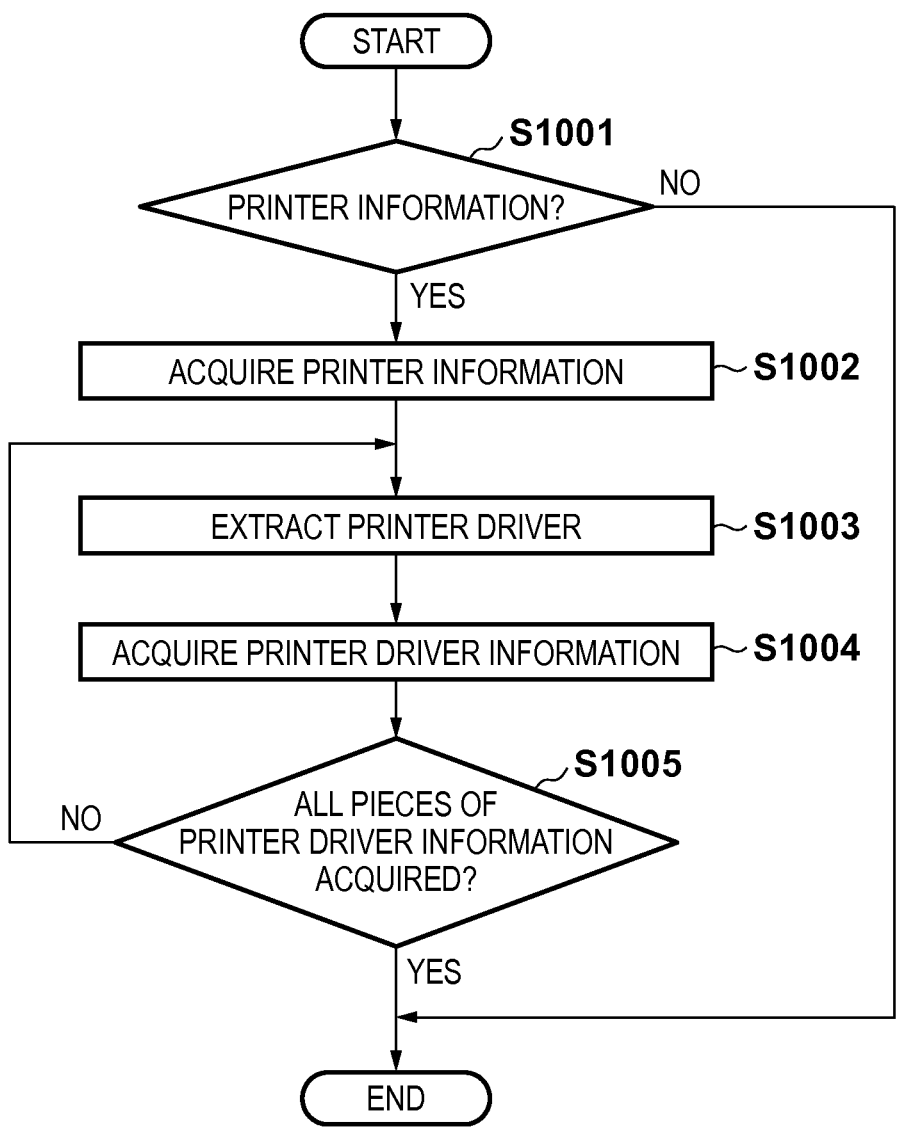
FIG. 10 is a flowchart showing the sequence of existing-connected printer information acquisition processing according to the first embodiment.

Referring back to the processing sequence in FIG. 6, the hot folder system unit 106 acquires existing-connected printer information in step S602. In the existing-connected printer information acquisition processing, pieces of printer information of all the printers 121 to 124 connected to the host PC 105 are acquired. The processing in step S602 will be explained with reference to FIG. 10.

In step S1001, the hot folder system unit 106 determines whether there is existing-connected printer information. If there is no existing-connected printer information (NO in step S1001), the processing sequence ends. If there is existing-connected printer information (YES in step S1001), the hot folder system unit 106 acquires all pieces of existing-connected printer information from the printer connection unit 402 in step S1002. In step S1003, the hot folder system unit 106 refers to one of the pieces of existing-connected printer information acquired in step S1002, and acquires the printer driver name 705 included in the referred existing-connected printer information.

In step S1004, the hot folder system unit 106 acquires printer driver information from the printer driver information pointer 708 of printer information corresponding to the printer driver name acquired in step S1003. If the hot folder system unit 106 determines in step S1005 that pieces of printer driver information corresponding to all existing-connected printers have been acquired (YES in step S1005), the processing sequence ends. If there is printer driver information which has not been acquired (NO in step S1005), the process returns to step S1003, and the hot folder system unit 106 repeats the processing for the printer driver information which has not been acquired.

Referring back to the processing sequence in FIG. 6, in step S603, the hot folder system unit 106 determines a printer most similar to the newly-connected printer among existing-connected printers in order to generate a hot folder corresponding to the newly-connected printer. A printer most similar to the newly-connected printer will be called a "copy source printer". The hot folder copy source printer determination processing in step S603 will be explained with reference to FIG. 11.

In step S1101, the hot folder system unit 106 initializes a printer similarity flag. The "printer similarity flag" is information which stores similarity representing whether a printer similar to a newly-connected printer exists in printers already connected to the host PC 105 or there is a printer of the same series. In the embodiment, when the printer device names, printer driver names, and printer driver versions of the newly-connected printer and existing-connected printer coincide with each other, "2" is set in the printer similarity flag. When the printer device names and printer driver names coincide with each other and the printer driver versions differ from each other, "1" is set in the printer similarity flag. When the printer model names and printer driver names differ from each other, "0" is set in the printer similarity flag. Note that "0" is set as the initial value of the printer similarity flag.

In steps S1102 to S1107, the hot folder system unit 106 compares printer information of the newly-connected printer acquired in step S601 with printer information of the existing-connected printer acquired in step S602. Then, the hot folder system unit 106 determines whether there is a printer which has the same printer driver as that of the newly-connected printer or is different in only the printer driver version. The hot folder system unit 106 refers to the printer driver name 705 included in the printer information and the device name 900 of printer driver information indicated by the printer driver information pointer 708.

If both the printer driver names 705 and device names 900 coincide with each other, respectively (YES in step S1102), the hot folder system unit 106 determines in step S1103 whether the driver versions 901 of the printers coincide with each other. If the printer driver versions also coincide with each other (YES in step S1103), the hot folder system unit 106 determines that the newly-connected printer and existing printer are of the same model. Hence, in step S1104, the hot folder system unit 106 sets "2" (all the printer device names, printer drivers, and printer driver versions coincide with each other) in the printer similarity flag. In step S1105, the hot folder system unit 106 sets printer information referred to as a copy source printer candidate. After that, the processing sequence ends.

In the embodiment, when the printer similarity flag is "2", the processing sequence ends after the processing of step S1105. However, it is also possible to refer to all pieces of printer information, and when there is another printer information for which the printer similarity flag is "2", hold pieces of printer information as copy source printer candidates.

If the versions differ from each other (NO in step S1103), the hot folder system unit 106 sets "1" (the printer device names and printer drivers coincide with each other, and only the printer driver versions differ from each other) in the printer similarity flag in step S1106. In step S1107, the hot folder system unit 106 sets printer information referred to as a copy source printer candidate. In step S1108, the hot folder system unit 106 determines whether all pieces of printer information have been referred to. If all pieces of printer information have been referred to (YES in step S1108), the process shifts to step S1109. If all pieces of printer information have not been referred to (NO in step S1108), the hot folder system unit 106 refers to unprocessed printer information, and repetitively performs the processes in steps S1102 to S1108.

In step S1109, to confirm whether a printer of the same series has been connected, the hot folder system unit 106 determines whether the printer similarity flag is "0". If the printer similarity flag is "0" (YES in step S1109), the process shifts to step S1110. If the printer similarity flag is not "0" (NO in step S1109), the process shifts to step S1113.

In step S1113, the hot folder system unit 106 determines whether the printer similarity flag is "1" (the printer driver names and printer drivers coincide with each other, and only the printer driver versions differ from each other). If the printer similarity flag is "1" (YES in step S1113), the hot folder system unit 106 determines that a printer of the same model has been connected. In step S1114, the hot folder system unit 106 performs print setting item difference detection. The print setting item difference detection in step S1114 will be described below with reference to FIG. 16. If the printer similarity flag is not "1" (NO in step S1113), the hot folder system unit 106 determines that a printer identical to the already-connected printer has been connected, and determines the printer set in step S1105 as a copy source printer. Thereafter, the processing sequence ends.

If the printer similarity flag is "0" (YES in step S1109), the hot folder system unit 106 determines that a printer of the same model does not exist in the existing-connected printers. In steps S1110 to S1112, the hot folder system unit 106 performs printer device name similarity calculation (step S1110) and print setting item difference detection (step S1111) by referring to printer information and printer driver information of the existing-connected printers. The printer device name similarity calculation (step S1110) will be described later with reference to FIG. 12. The print setting item difference detection (step S1111) will be described later with reference to FIG. 16.

In step S1112, the hot folder system unit 106 sets, as a copy source printer candidate, a printer having highest similarity among the existing-connected printers based on similarities obtained in steps S1110 and S1111. First, the hot folder system unit 106 acquires a printer having highest similarity by referring to the similarities of printer device names. If printer device names have the same similarity, the hot folder system unit 106 refers to the similarities of the print setting items of the printers. The hot folder system unit 106 determines, as a copy source printer, a printer having highest similarity among the similarities of the print setting items. The processing sequence then ends.

Figure 11:
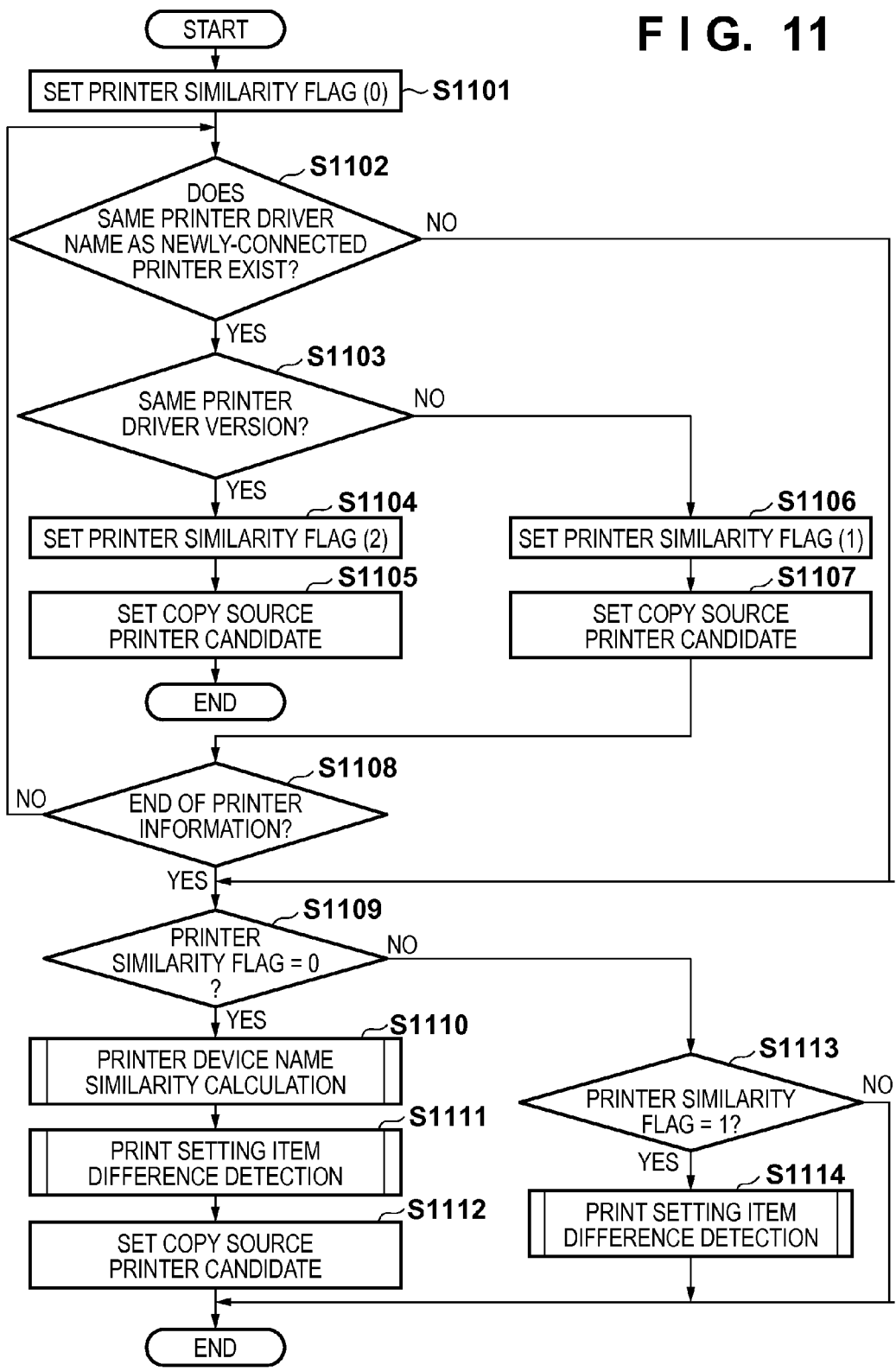
FIG. 11 is a flowchart showing the sequence of hot folder copy source printer determination processing according to the first embodiment.

Note that the printer similarity flag is set using the printer name, printer driver name, and driver version in the processes of steps S1102 to S1108 of FIG. 11, but may be determined and set using another information. Also, the printer similarity flag is configured to take a value of 0 to 2 in the embodiment, but may be changed in accordance with the type of information used here or the like.

Referring back to the processing sequence of FIG. 6, the hot folder system unit 106 acquires hot folder information of the copy source printer in step S604. The hot folder system unit 106 acquires the printer name 1305 for each hot folder information from pieces of hot folder information stored in the ROM 303 and RAM 304. The hot folder system unit 106 compares the printer name 701 of printer information with a printer name set as a copy source printer candidate. The hot folder system unit 106 acquires hot folder information of an existing-connected printer having a coincident printer name. At this time, when a plurality of hot folders exist for one printer, the hot folder system unit 106 acquires all pieces of hot folder information.

In step S605, the hot folder system unit 106 selects hot folder information (to be referred to as a "copy source hot folder" hereinafter) serving as a copy source to be assigned to the newly-connected printer. The hot folder may be selected by the hot folder system unit 106 or the user. Whether the user selects a copy source hot folder from a plurality of hot folders may be set in advance, or changed in accordance with the number of copy source hot folders.

Figure 14:
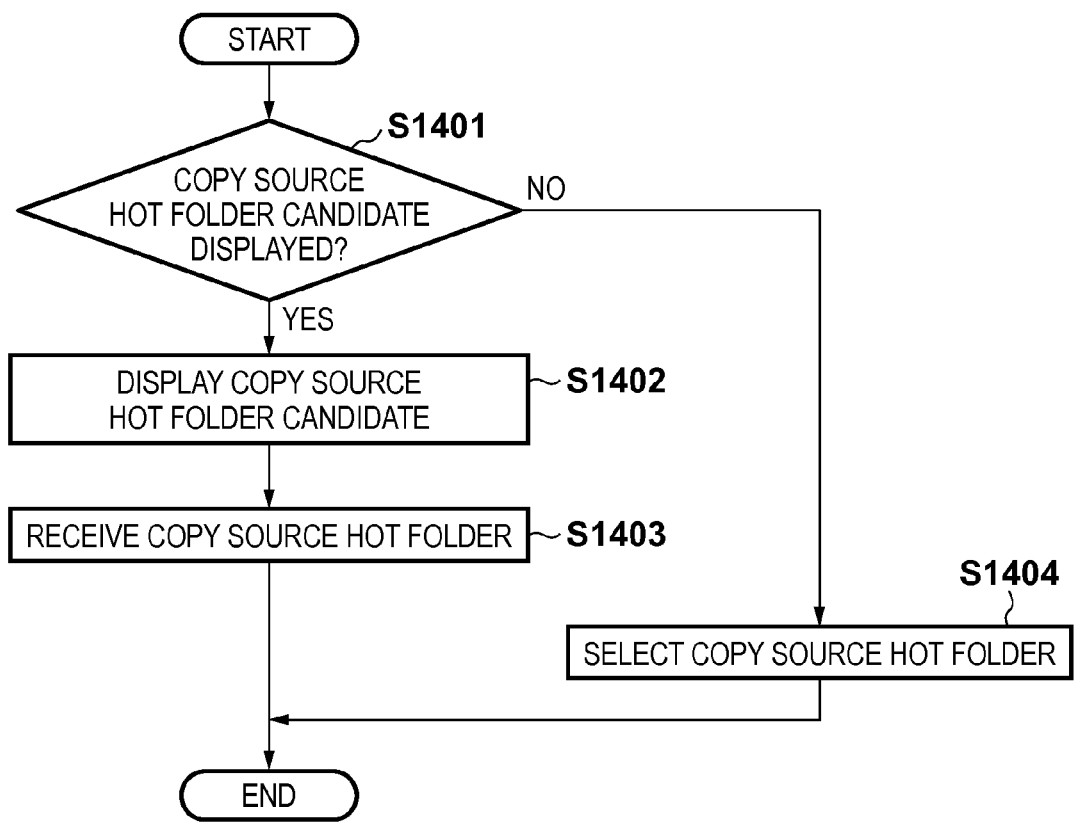
FIG. 14 is a flowchart showing the sequence of copy source printer hot folder candidate selection processing according to the first embodiment.
Figure 15:
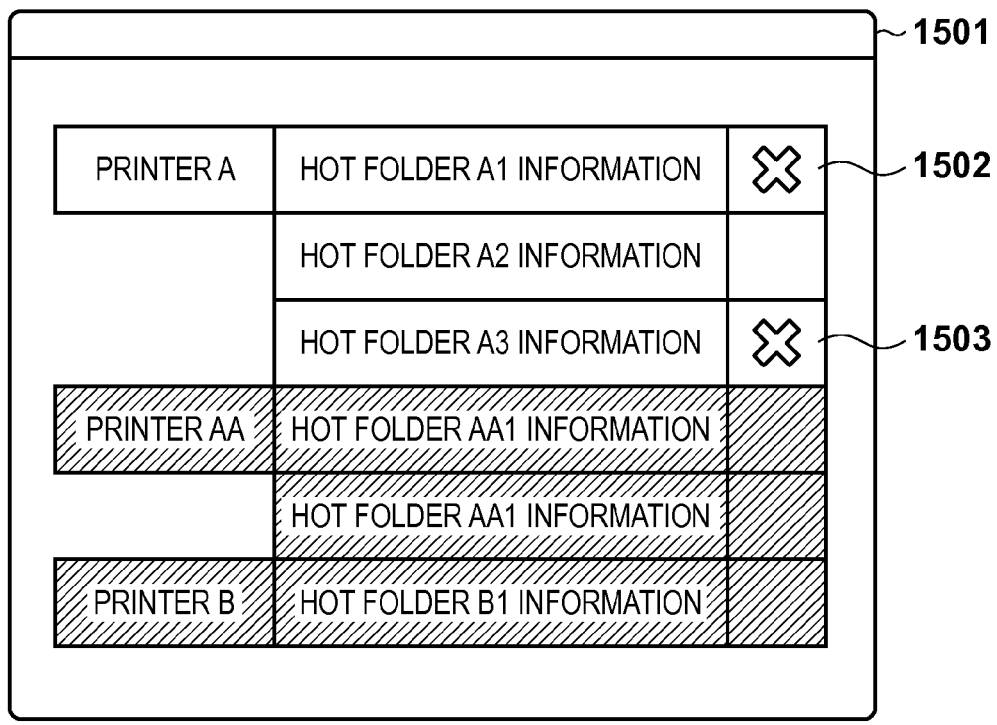
FIG. 15 is a view exemplifying a copy source printer hot folder candidate selection screen according to the first embodiment.

The processing in step S605 will be explained with reference to FIGS. 14 and 15. In step S1401, the hot folder system unit 106 determines whether to present copy source hot folder candidates to the user and prompt him to select one of them. If the hot folder system unit 106 determines to present copy source hot folder candidates to the user and prompt him to select one of them (YES in step S1401), it performs processes in steps S1402 and S1403. If the hot folder system unit 106 determines not to prompt the user to select one of copy source hot folder candidates (NO in step S1401), it selects all pieces of hot folder information acquired in step S604 as copy source hot folders in step S1404. If the hot folder system unit 106 determines to prompt the user to select one of copy source hot folder candidates, it displays pieces of hot folder information acquired in step S604 as copy source hot folder candidates, as represented by a selection screen 1501 in FIG. 15 (step S1402).

In step S1403, the hot folder system unit 106 acquires a hot folder designated by the user, and selects it as a copy source hot folder. The selection screen 1501 shown in FIG. 15 represents that the user selects hot folders 1502 and 1503 with "x" as copy source hot folders. Note that the selection screen 1501 shown in FIG. 15 is merely an example, and the screen arrangement is not limited to this. After that, the processing sequence ends.

Referring back to the processing sequence of FIG. 6, in step S606, the hot folder system unit 106 copies the hot folder information selected in step S605 and registers it as hot folder information of the newly-connected printer. As for setting items (for example, the HotFolder Name 1302 and HotFolder Path 1303) which cannot be directly copied and used, the hot folder system unit 106 changes the set values to be able to identify the hot folder information, and sets the resultant hot folder information for the newly-connected printer. The printer name of the hot folder information stores the printer name of the newly-connected printer. The processing sequence then ends.

(Printer Device Name Similarity Calculation Processing)

The printer device name similarity calculation processing in step S1110 of FIG. 11 will be explained with reference to FIG. 12.

In step S1201, the hot folder system unit 106 acquires the device name of the newly-connected printer from the printer information acquired in step S601. In step S1202, the hot folder system unit 106 acquires the device name of the existing-connected printer acquired in step S602. In step S1203, the hot folder system unit 106 calculates similarity by using the device names acquired in steps S1201 and S1202. For example, the similarity is calculated using the following equation:

$$\text{similarity} = \text{SUM}((1/\text{number of words of device name of newly-connected printer})*(\text{number of characters coincident with word characters of device name of newly-connected printer}(\text{number of coincident characters from start}))/(\text{number of word characters of device name of newly-connected printer}))$$

For example, a case in which the device name of the newly-connected printer is "iR-AAA C1111F", as shown in a of FIG. 12, will be explained. In this case, a of FIG. 12 is divided into a1 and a2 by spaces.

Figure 12:
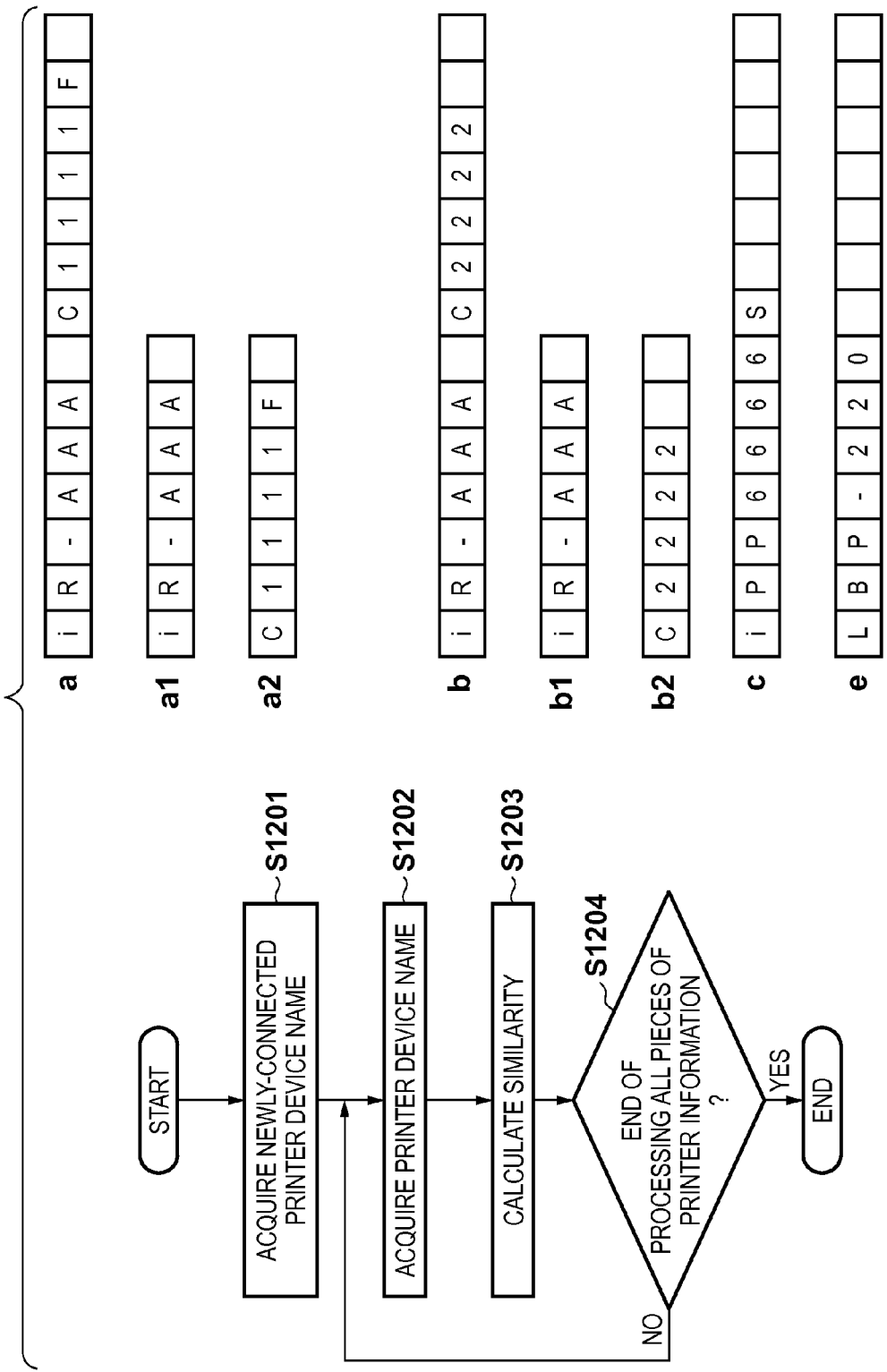
FIG. 12 is a flowchart showing the sequence of printer device name similarity calculation processing according to the first embodiment.

When the device name of a printer to be compared is "iR-AAA C2222", as shown in b of FIG. 12, b of FIG. 12 is divided into b1 and b2 by spaces. At this time, the similarity is calculated as follows using the above equation:

$$\text{similarity of b}: (1/2)*(6/6)+(1/2)*(1/6)=0.583$$

When a device name to be compared is "iPP6666S", as shown in c of FIG. 12, a1 and c are compared because c of FIG. 12 does not have a space. As a result, the similarity is calculated as follows:

$$\text{similarity of c}: (1/2)*(1/6)+(1/2)*(0/6)=0.083$$

As described above, steps S1202 to S1204 are repeated to obtain the similarities of existing-connected printer from their device names. The similarity is not limited to this, and may be obtained from the number of coincident characters from the first character, or the like.

(Print Setting Item Difference Detection Processing)

Figure 16:
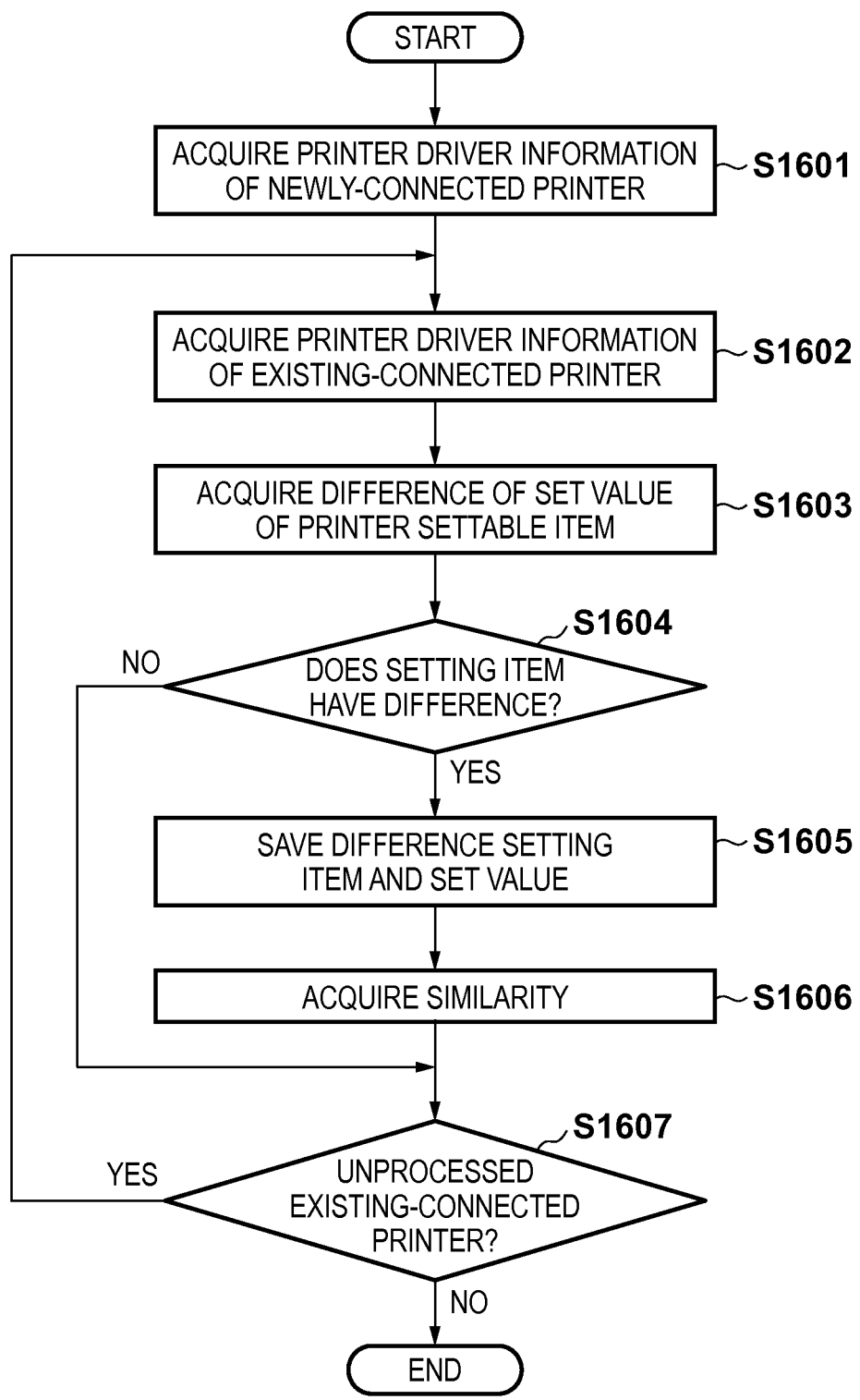
FIG. 16 is a flowchart showing the sequence of printer device name similarity calculation processing according to the first embodiment.

The print setting item difference detection processing in step S1111 of FIG. 11 will be explained with reference to FIG. 16.

In step S1601, the hot folder system unit 106 acquires printer driver information of the newly-connected printer. More specifically, the hot folder system unit 106 acquires printer driver information from the printer information acquired in the newly-connected printer information acquisition processing (step S601).

In steps S1602 to S1607, the hot folder system unit 106 refers to the print setting items and set values of printer driver information of an existing-connected printer. The hot folder system unit 106 compares the print setting items and set values of the printer driver information of the existing-connected printer with those of the printer driver information of the newly-connected printer.

First, in step S1602, the hot folder system unit 106 acquires one of pieces of printer information of existing-connected printers acquired in step S602, and acquires printer driver information.

Then, in step S1603, the hot folder system unit 106 acquires the difference of a setting item settable in each printer. The hot folder system unit 106 acquires and compares the support setting flag of the printer driver information of the newly-connected printer and that of the printer driver information of the existing-connected printer, thereby acquiring the difference of the setting item.

In step S1604, the hot folder system unit 106 compares the support setting flags, and determines whether the setting item has a difference. If the setting item does not have a difference (NO in step S1604), the hot folder system unit 106 shifts to step S1607. In step S1607, the hot folder system unit 106 determines whether there is an unprocessed existing-connected printer. If there is no unprocessed existing-connected printer (NO in step S1607), the processing sequence ends. If there is an unprocessed existing-connected printer (YES in step S1607), the hot folder system unit 106 acquires printer information of the unprocessed existing-connected printer from pieces of printer information of existing-connected printers, and repeats the processes in steps S1602 to S1607.

If the hot folder system unit 106 determines that the set value has a difference (YES in step S1604), it saves the setting items and set values of the existing-connected printer and newly-connected printer in step S1605. In step S1606, the hot folder system unit 106 acquires similarity based on the number of saved setting items and their set values. The similarity is determined by the number of setting items each having a difference. Thereafter, the process advances to step S1607.

An example when a difference is acquired in step S1603 will be explained. FIG. 18 exemplifies the support setting flag. When X of FIG. 18 shows the support setting flag of the newly-connected printer, "0" is stored in the setting items "double-sided printing flag", "TrueType font printing method information", "pixel count", and "dithering method". This indicates that these settings are not supported. When Y of FIG. 18 shows the support setting flag of the existing-connected printer, "0" is stored in the setting items "TrueType font printing method information", "pixel count", and "dithering method". This indicates that these settings are not supported. A comparison between the support setting flags of the newly-connected printer and existing-connected printer reveals that the "double-sided printing flag" cannot be set in the newly-connected printer. In this case, the similarity is "−1". A smaller similarity value indicates lower similarity between the newly-connected printer and the existing-connected printer.

In the above example, the difference of a setting item is acquired. However, even if the same setting item is settable between the newly-connected printer and the existing-connected printer, a range which can be designated as a set value may differ between them. Hence, even when the same setting item is supported, but its settable range is different, the difference of the settable range may be acquired as the difference of the setting item.

(Re-Setting Processing)

Figure 17B:
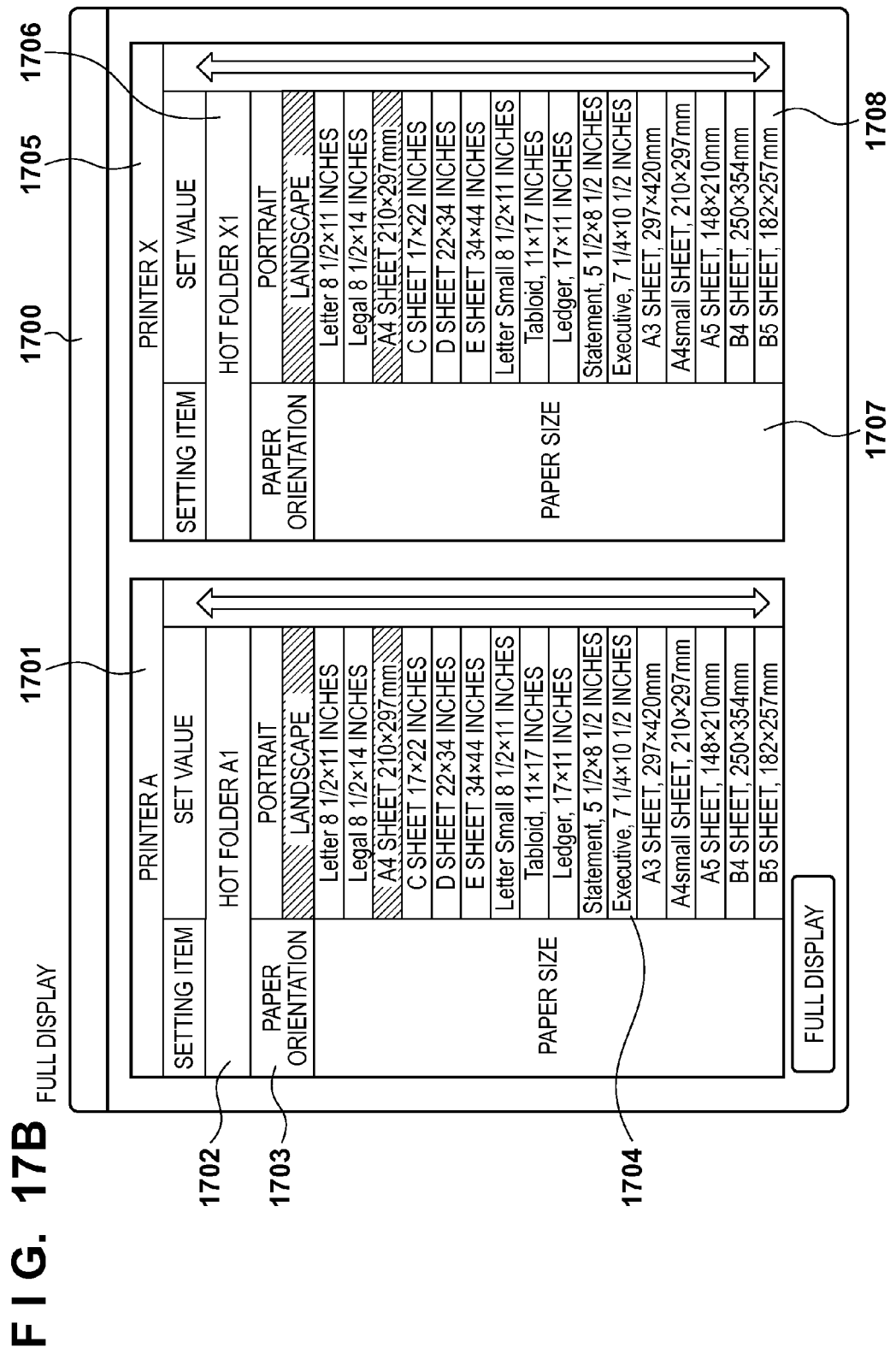

FIGS. 17A and 17B show examples of a re-setting screen, and the re-setting processing (step S503) in FIG. 5 will be explained.

The re-setting processing according to the embodiment is executed when there is a difference in print setting information between a printer selected as a copy source printer and a newly-connected printer. This determination is made based on the result of the settable setting item difference detection in step S1111 or S1114 of FIG. 11.

If there is a difference in a print setting item (YES in step S1604), set value difference displays as shown in FIGS. 17A and 17B are presented for the difference setting items and set values acquired in step S1605. The hot folder system unit 106 displays a comparison setting screen 1700. The printer name of the newly-connected printer is displayed at an item 1705. The printer name of the copy source printer is displayed at an item 1701. The copy source hot folder name of the copy source printer is displayed at an item 1702. A hot folder name generated using the copy source hot folder is displayed at an item 1706. In the comparison setting screen 1700, the setting item names and set values of each hot folder are displayed.

In a difference display as shown in FIG. 17A, setting items 1703 and 1707 display different setting item names between the newly-connected printer and the copy source printer. Set values 1704 and 1708 corresponding to the setting items 1703 and 1707 display settable set values. If a set value is selected at this time, a message indicative of this is displayed explicitly. In this case, selected setting items are displayed in color.

In a full display as shown in FIG. 17B, the setting item names of each printer are displayed. Similar to FIG. 17A, the set values 1704 and 1708 display set values for setting items. Further, set values used in the hot folder are displayed explicitly.

As shown in FIG. 17A, print setting items which are prepared in the newly-connected printer but not in the copy source printer are displayed as represented by the setting item 1707, and the user can set values from the set value 1708.

As described above, the present invention has the following effects. (1) No hot folder template need be prepared in advance. (2) A plurality of hot folders can be easily copied by referring to an existing-connected printer, and hot folders can be generated at once. (3) The operator need not search existing hot folders or hot folder templates for a hot folder matching a newly-connected printer. (4) Since a hot folder suitable for a newly-connected printer is used as a copy source, the number of items to be set again decreases. (5) Even if a setting item has a difference between an existing-connected printer and a newly-connected printer, a message indicative of this can be presented to the operator to prompt him to set the setting item again, thereby preventing generation of a mismatch. (6) When there is a connected printer, the process automatically shifts to hot folder generation, and the operator need not individually monitor whether a printer has been added.

In the present invention, a hot folder is copied in a state close to settings used by the user, so the number of re-setting items decreases. If re-setting is necessary, the difference of a setting item is displayed, facilitating re-setting. The present invention is effective particularly when there are many hot folders to be copied.

<Second Embodiment>

The second embodiment of the present invention will be described. In the first embodiment, the similarity is calculated, and a printer having highest similarity is used as a copy source printer.

In the second embodiment, when the hot folder of a copy source printer is not used, a conventional hot folder generation screen may be displayed to generate a hot folder for a new printer. For example, when the user presses a new hot folder generation button 1902 in a copy source printer hot folder candidate selection screen 1901 in FIG. 19, a conventional hot folder generation screen 201 in FIG. 2 appears, and the user can generate a new hot folder. In addition to the effects of the first embodiment, a hot folder further complying with the purpose of the user can be generated.

<Third Embodiment>

The third embodiment of the present invention will be described. In the first embodiment, the similarity is calculated, and a printer having highest similarity is displayed as a copy source printer.

However, the present invention is not limited to this. In the third embodiment, the hot folders of copy source printers may be displayed in descending order of the similarity in a copy source printer hot folder candidate selection screen 1501 in FIG. 15, and the user may arbitrarily select the hot folder of a copy source printer. In addition to the effects of the first embodiment, the user can be provided with information of a hot folder to be generated.

<Fourth Embodiment>

The fourth embodiment of the present invention will be described. In the first embodiment, priority is given to the similarity of device information (printer information) in similarity calculation. When there are devices having the same similarity, the priority is calculated in consideration of similarity based on the difference of a print setting item, and a copy source printer is extracted.

However, the present invention is not limited to this. In the fourth embodiment, the similarity is obtained by giving priority to the degree of coincidence of the setting items of print settings. This method calculates similarity not from the model and functions of a printer, but by preferentially taking account of a product to be printed (print setting).

For example, the similarity of the printer device name is calculated in step S1110 of FIG. 11, and if the highest similarity is lower than a predetermined value, print setting item difference detection is performed for all existing-connected printers. Then, an existing-connected printer having a smallest difference is used as a copy source printer.

In addition to the effects of the first embodiment, a hot folder complying with the user's intention can be generated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-094181, filed Apr. 17, 2012, which is hereby incorporated by reference herein in its entirety.

What is claimed is:

1. An information processing apparatus comprising:
a non-transitory memory device;
a processor;
a holding unit configured to hold device information corresponding to printing apparatuses already connected to the information processing apparatus, and information of hot folders corresponding to the already-connected printing apparatuses;
a determination unit configured to determine a printing apparatus similar to a printing apparatus newly connected to the information processing apparatus among the already-connected printing apparatuses by comparing device information of the newly-connected printing apparatus with the device information of the already-connected printing apparatuses; and
a generation unit configured to generate a hot folder corresponding to the newly-connected printing apparatus by copying information of a hot folder corresponding to the printing apparatus determined by said determination unit,
wherein the holding unit is configured to delete the information of a hot folder corresponding to the printing apparatus for which a printer driver has been deleted upon the printer driver corresponding to the printing apparatus being uninstalled from the information processing apparatus, and
wherein the holding unit, the determination unit, and the generation unit are implemented by the processor executing at least one program recorded on the non-transitory memory device.

2. The information processing apparatus according to claim 1, further comprising a display unit configured, in a case where a setting item of a print setting settable in the printing apparatus determined by said determination unit and a setting item of a print setting settable in the newly-connected printing apparatus have a difference, to display the setting item having the difference, and to display a screen for receiving a setting to the setting item having the difference in the hot folder corresponding to the newly-connected printing apparatus,
wherein the display unit is implemented by the processor executing at least one program recorded on the non-transitory memory device.

3. The information processing apparatus according to claim 1, wherein in a case where a plurality of printing apparatuses are connected to the information processing apparatus, said determination unit determines a printing apparatus most similar to the newly-connected printing apparatus among the plurality of printing apparatuses.

4. The information processing apparatus according to claim 1, wherein in a case where a plurality of printing apparatuses are similar to the newly-connected printing apparatus, said determination unit presents the plurality of similar printing apparatuses to a user, and determines a printing apparatus based on selection by the user.

5. The information processing apparatus according to claim 1, wherein said determination unit determines whether a printing apparatus is similar to the newly-connected printing apparatus, by comparing device names, driver names, and driver versions of the printing apparatuses included in the device information.

6. The information processing apparatus according to claim 1, wherein said determination unit determines, by using a number of coincident setting items of print settings settable in the printing apparatuses, whether a printing apparatus is similar to the newly-connected printing apparatus.

7. The information processing apparatus according to claim 1, wherein in a case where said holding unit holds information of a plurality of hot folders corresponding to the printing apparatus similar to the newly-connected printing apparatus, said generation unit generates a hot folder corresponding to the newly-connected printing apparatus by copying all the information of the plurality of hot folders.

8. The information processing apparatus according to claim 1, further comprising a selection unit configured, in a case where said holding unit holds information of a plurality of hot folders corresponding to the printing apparatus similar to the newly-connected printing apparatus, to display information of a hot folder used to generate a hot folder corresponding to the newly-connected printing apparatus to allow a user to select the information of the hot folder from the information of the plurality of hot folders,
wherein the selection unit is implemented by the processor executing at least one program recorded on the non-transitory memory device.

9. An information processing method in an information processing apparatus, comprising:
holding, in a storage device, device information corresponding to printing apparatuses already connected to the information processing apparatus, and information of hot folders corresponding to the already-connected printing apparatuses;
determining a printing apparatus similar to a printing apparatus newly connected to the information processing apparatus among the already-connected printing apparatuses by comparing device information of the newly-connected printing apparatus with the device information of the already-connected printing apparatuses;
generating a hot folder corresponding to the newly-connected printing apparatus by copying information of a hot folder corresponding to the determined printing apparatus; and
deleting the information of a hot folder corresponding to the printing apparatus for which a printer driver has been deleted upon the printer driver corresponding to the printing apparatus being uninstalled from the information processing apparatus.

10. The method according to claim 9, further comprising: in a case where a setting item of a print setting settable in the determined printing apparatus and a setting item of a print setting settable in the newly-connected printing apparatus have a difference, displaying the setting item having the difference, and displaying a screen for receiving a setting to the setting item having the difference in the hot folder corresponding to the newly-connected printing apparatus.

11. The method according to claim 9, wherein in a case where a plurality of printing apparatuses are connected to the information processing apparatus, a printing apparatus most similar to the newly-connected printing apparatus is determined among the plurality of printing apparatuses.

12. The method according to claim 9, wherein in a case where a plurality of printing apparatuses are similar to the newly-connected printing apparatus, the plurality of similar printing apparatuses are presented to a user, and a printing apparatus is determined based on selection by the user.

13. The method according to claim 9, wherein whether a printing apparatus is similar to the newly-connected printing apparatus is determined by comparing device names, driver names, and driver versions of the printing apparatuses included in the device information.

14. The method according to claim 9, wherein whether a printing apparatus is similar to the newly-connected printing apparatus is determined by using a number of coincident setting items of print settings settable in the printing apparatuses.

15. The method according to claim 9, wherein in a case where information of a plurality of hot folders corresponding to the printing apparatus similar to the newly-connected printing apparatus is held, a hot folder corresponding to the newly-connected printing apparatus is generated by copying all the information of the plurality of hot folders.

16. The method according to claim 9, wherein, in a case where information of a plurality of hot folders corresponding to the printing apparatus similar to the newly-connected printing apparatus is held, information of a hot folder used to generate a hot folder corresponding to the newly-connected printing apparatus is selected from the information of the plurality of hot folders in accordance with an instruction from a user.

17. A non-transitory computer-readable medium storing a computer program that, when executed, causes performance of an information processing method in an information processing apparatus, the method comprising:

holding, in a storage device, device information corresponding to printing apparatuses already connected to the information processing apparatus, and information of hot folders corresponding to the already-connected printing apparatuses;

determining a printing apparatus similar to a printing apparatus newly connected to the information processing apparatus among the already-connected printing apparatuses by comparing device information of the newly-connected printing apparatus with the device information of the already-connected printing apparatuses;

generating a hot folder corresponding to the newly-connected printing apparatus by copying information of a hot folder corresponding to the determined printing apparatus; and deleting the information of a hot folder corresponding to the printing apparatus for which a printer driver has been deleted upon the printer driver corresponding to the printing apparatus being uninstalled from the information processing apparatus.

\* \* \* \* \*